(12) United States Patent
Herritz

(10) Patent No.: US 12,447,601 B2
(45) Date of Patent: Oct. 21, 2025

(54) SOCKET STORAGE DEVICE

(71) Applicant: Milwaukee Electric Tool Corporation, Brookfield, WI (US)

(72) Inventor: Devin W. Herritz, Sussex, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/715,613

(22) PCT Filed: Nov. 18, 2022

(86) PCT No.: PCT/US2022/080162
§ 371 (c)(1),
(2) Date: May 31, 2024

(87) PCT Pub. No.: WO2023/092085
PCT Pub. Date: May 25, 2023

(65) Prior Publication Data
US 2024/0408740 A1  Dec. 12, 2024

Related U.S. Application Data

(60) Provisional application No. 63/281,210, filed on Nov. 19, 2021.

(51) Int. Cl.
| B65D 85/28 | (2006.01) |
| B25H 3/00 | (2006.01) |
| B25H 3/04 | (2006.01) |
| B25H 3/06 | (2006.01) |
| B65D 1/34 | (2006.01) |
| B65D 25/10 | (2006.01) |

(52) U.S. Cl.
CPC .............. *B25H 3/003* (2013.01); *B25H 3/06* (2013.01); *B65D 1/34* (2013.01); *B65D 25/106* (2013.01); *B65D 25/108* (2013.01)

(58) Field of Classification Search
CPC ...... B65D 1/34; B65D 25/106; B65D 25/108; B25H 3/003; B25H 3/04; B25H 3/06
USPC ................. 206/372, 376, 378, 379; 211/70.6
See application file for complete search history.

(56) References Cited

U.S. PATENT DOCUMENTS

| 3,405,377 A | 10/1968 | Pierce |
| 5,080,230 A | 1/1992 | Winnard |

(Continued)

FOREIGN PATENT DOCUMENTS

| CN | 203792310 U | 8/2014 |
| DE | 102013110686 | 8/2014 |

(Continued)

OTHER PUBLICATIONS

International Search Report and Written Opinion for International Application No. PCT/US2022/080162, dated Apr. 13, 2023, 10 pages.

*Primary Examiner* — Luan K Bui
(74) *Attorney, Agent, or Firm* — Reinhart Boerner Van Deuren s.c.

(57) ABSTRACT

Various socket storage systems are shown. The socket storage system includes one or more storage rails, socket holders of various sizes and socket posts. The socket storage rail includes a plurality of dovetail attachments allowing for selectively coupling between socket storage rails. The socket holders are adjustable relative to the socket storage rail for additional customization.

20 Claims, 30 Drawing Sheets

(56) References Cited

U.S. PATENT DOCUMENTS

| | | |
|---|---|---|
| 5,501,342 A | 3/1996 | Geibel |
| 5,660,276 A | 8/1997 | Winnard |
| 5,715,951 A | 2/1998 | Dembicks |
| 5,725,096 A | 3/1998 | Winnard |
| 5,725,107 A | 3/1998 | Dembicks |
| 5,743,394 A | 4/1998 | Martin |
| 5,855,284 A | 1/1999 | Dembicks |
| 5,855,285 A | 1/1999 | Laird et al. |
| 5,897,001 A | 4/1999 | Dembicks |
| 6,047,824 A | 4/2000 | Winnard |
| 6,073,766 A | 6/2000 | Winnard |
| 6,386,363 B1 | 5/2002 | Huang |
| 7,905,354 B1 | 3/2011 | Geibel |
| 8,336,709 B1 | 12/2012 | Geibel |
| 9,126,329 B2 | 9/2015 | Kao |
| 9,247,832 B2 | 2/2016 | Chang |
| 9,452,524 B1 | 9/2016 | Kao |
| 9,522,467 B1 | 12/2016 | Kao |
| 9,539,721 B1 | 1/2017 | Kao |
| 9,662,781 B1 | 5/2017 | Kao |
| 9,821,451 B1 | 11/2017 | Kao |
| 9,878,441 B1 | 1/2018 | Kao |
| 9,914,207 B2 | 3/2018 | Kao |
| 9,925,657 B1 * | 3/2018 | Kao .......... B25H 3/04 |
| 9,956,670 B2 | 5/2018 | Feuerstein et al. |
| 10,022,857 B2 * | 7/2018 | Kao .......... B25H 3/04 |
| 10,118,287 B2 | 11/2018 | Billups, Jr. |
| 10,493,616 B2 | 12/2019 | Billups, Jr. |
| D880,977 S | 4/2020 | Kukucka et al. |
| D887,711 S | 6/2020 | Kukucka et al. |
| 10,675,750 B1 | 6/2020 | Winnard et al. |
| D899,091 S | 10/2020 | Kukucka et al. |
| 10,792,803 B1 * | 10/2020 | Kao .......... B25H 3/003 |
| 10,828,766 B2 | 11/2020 | Kukucka et al. |
| D904,152 S | 12/2020 | Kukucka et al. |
| D906,781 S | 1/2021 | Kukucka et al. |
| D909,842 S | 2/2021 | Kukucka et al. |
| D911,830 S | 3/2021 | Kukucka et al. |
| 10,960,532 B2 | 3/2021 | Billups, Jr. |
| 11,059,164 B2 | 7/2021 | Winnard et al. |
| 11,986,944 B1 * | 5/2024 | Kao .......... B25H 3/04 |
| 2009/0145865 A1 | 6/2009 | Yu |
| 2014/0209780 A1 | 7/2014 | Chang |
| 2015/0034518 A1 | 2/2015 | Kao |
| 2015/0034572 A1 | 2/2015 | Kao |
| 2015/0252827 A1 * | 9/2015 | Ou .......... B25H 3/04 211/13.1 |
| 2017/0361453 A1 * | 12/2017 | Kao .......... B25H 3/003 |
| 2018/0361563 A1 | 12/2018 | Hurley |
| 2018/0361564 A1 | 12/2018 | Hurley |
| 2019/0283233 A1 | 9/2019 | Kukucka et al. |
| 2020/0101590 A1 * | 4/2020 | Winnard .......... B25H 3/003 |
| 2020/0122315 A1 | 4/2020 | Hurley |
| 2021/0039245 A1 | 2/2021 | Kukucka et al. |
| 2021/0237256 A1 | 8/2021 | Billups, Jr. |
| 2025/0033187 A1 * | 1/2025 | Kao .......... B25H 3/003 |

FOREIGN PATENT DOCUMENTS

| | | |
|---|---|---|
| DE | 102014103871 | 7/2015 |
| DE | 102014016977 | 9/2015 |
| DE | 102016109268 | 12/2016 |
| DE | 102016108763 | 11/2017 |
| DE | 102016121164 | 5/2018 |
| DE | 102019115784 | 12/2020 |
| JP | 3233607 U | 8/2021 |
| WO | WO18182744 | 10/2018 |

* cited by examiner

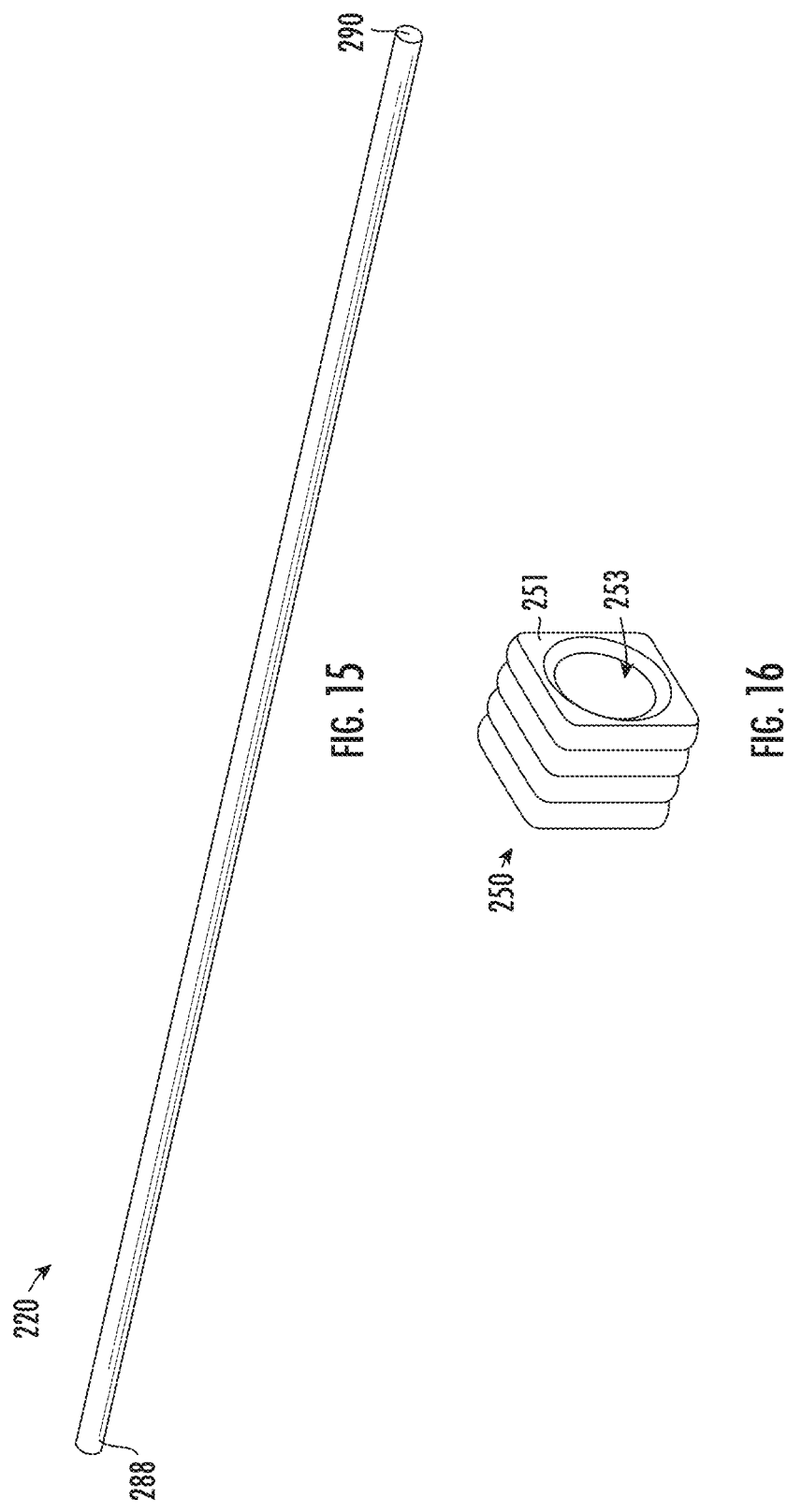

SOCKET STORAGE DEVICE

CROSS-REFERENCE TO RELATED PATENT APPLICATIONS

This application is a National Stage entry of International Application No. PCT/US2022/080162, filed on Nov. 18, 2022, which claims priority to U.S. Provisional Application No. 63/281,210, filed on Nov. 19, 2021, both of which are incorporated herein by reference in their entireties.

BACKGROUND OF THE INVENTION

The present invention relates generally to the field of tool storage. The present invention relates specifically to various socket holders or storage attachment devices designed to better retain or hold sockets on the storage attachment device.

SUMMARY OF THE INVENTION

One embodiment of the invention relates to a socket storage system including a first socket rail. The first socket rail includes an upper body portion, a lower body portion, and a bar. The upper body portion includes a plurality of walls that define a plurality of slots between adjacent walls. The lower body portion is coupled to the upper body portion and the bar is positioned between the upper body portion and the lower body portion. The bar extends along a longitudinal axis of the first socket rail. The socket storage system further includes a socket holder. The socket holder removably couples to the first socket rail. Each of the plurality of slots is configured to receive a socket holder. When the socket holder is positioned within one of the plurality of slots, the socket holder extends around and engages the bar to couple the socket holder to the first socket rail.

Another embodiment of the invention relates to a socket storage system including a socket rail. The socket rail includes an upper body portion, a lower body portion, a locking bar, and a sliding lock. The upper body portion includes a plurality of walls that define a plurality of slots between adjacent walls. The lower body portion is coupled to the upper body portion. The locking bar is positioned between the upper body portion and the lower body portion and extends along a longitudinal axis of the socket rail. The sliding lock is coupled to an end of the locking bar and is slidably engaged with the upper body portion. The socket storage system further includes a socket holder. The socket holder is configured to be received within the plurality of slots and coupled to the socket rail by the locking bar. The sliding lock is moveable between an unlocked position in which the socket holder is removable from the socket rail and a locked position in which the locking bar engages the socket holder to secure the socket holder to the socket rail.

Another embodiment of the invention relates to a socket storage system including a first socket rail and a second socket storage rail. The first socket rail includes an upper body portion, a lower body portion, and a locking bar. The upper body portion includes a plurality of walls that define a plurality of slots between adjacent walls. The lower body portion is coupled to the upper body portion. The locking bar is positioned between the upper body portion and the lower body portion and extends along a first longitudinal axis of the first socket rail. The second socket rail includes an upper body portion, a lower body portion, and a locking bar. The upper body portion includes a plurality of walls that define a plurality of slots between adjacent walls. The lower body portion is coupled to the upper body portion. The locking bar is positioned between the upper body portion and the lower body portion and extends along a second longitudinal axis of the second socket rail. The socket storage system further includes a socket holder. The socket holder removably couples to the first socket rail or the second socket rail. The first socket rail and the second socket rail each include a plurality of dovetail attachments and attachment recesses positioned along an outer wall of the upper body portion such that the first socket rail and the second socket rail can be removably coupled together.

Another embodiment of the invention relates to a socket storage device including one or more socket rails and a plurality of socket holders. The socket rail includes an upper body portion, a lower body portion, a locking bar, and a sliding lock. The upper body portion releasably couples to the lower body portion. The locking bar is positioned between upper body portion and lower body portion and extends along a major axis of the socket rail. The socket rail includes a plurality of walls extending in an orientation across the major axis, and in specific embodiments, the plurality of walls are generally parallel to a minor axis. The plurality of walls define a plurality of slots, with each slot configured to receive a socket holder. When positioned within a slot, the socket holder at least partially extends around and engages with the locking bar to couple the socket holder to the socket rail. The upper body portion of the socket rail further includes a plurality of dovetail attachments and recesses configured to receive and engage with the dovetail attachments of another socket rail, such that a socket rails can be selectively coupled together.

Another embodiment of the invention relates to a magnetic socket storage device including one or more socket rails and a plurality of socket holders. The socket rail includes an upper body portion and a base portion that are releasably coupled. Each socket holder includes a magnet within the socket holder to retain a socket. The socket rail further includes a plurality of dovetail attachments and recesses configured to receive and engage with the dovetail attachments of another socket rail, such that socket rails can selectively be coupled together.

Another embodiment of the invention relates to an adjustable magnetic socket storage device including one or more socket rails and a plurality of adjustable socket holders. The socket rail includes an upper body portion, a bar, and a base that are releasably coupled. Each socket holder includes a magnet positioned within the socket holder to retain a socket. The socket rail further includes a plurality of dovetail attachments and recesses configured to receive and engage with the dovetail attachments of another socket rail, such that socket rails can be selectively coupled together.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which:

FIG. 15 is a perspective view of the locking bar of the socket storage system of FIG. 13, according to an exemplary embodiment.

FIG. 16 is a locking bar end cap of the socket storage system of FIG. 13, according to an exemplary embodiment.

DETAILED DESCRIPTION

Referring generally to the figures, various embodiments of an adjustable socket storage system, are shown. Various embodiments of the socket storage system discussed herein allow for one or more of the storage rails to selectively couple to each other in a modular storage system, such as a tool storage unit. The storage rails include a plurality of connectors, shown as dovetail attachments on the sides and/or ends of the storage rails. When connected by the dovetail attachments, the storage rails can be more easily carried around (e.g., becomes like carrying a tray rather than individual rails). Further, the connection of various storage rails provides increased stability for the socket storage device. For example, when various storage rails are coupled and placed in drawer (e.g., in a tool chest, cart, box, etc.) if the drawer is slammed shut by a user, the coupled rails help prevent the storage rails from falling or tipping over due to the lower center of gravity.

Additionally, Applicant believes the storage system provides a more reliable attachment of the socket holders, shown as clips. The storage rail includes a plurality of discrete slots or locations to position the socket holders within so that the socket holders will not slide around and move over time (e.g., as rails are carried or stored in drawer etc.). Further, the various discrete locations for socket holder attachment allows for additional customization of the socket storage system. For example, a large socket that may require more space relative to smaller socket can be attached to a slot farther away, while the smaller sockets can still be positioned in slots closer together to maximize storage space.

In various embodiments, the socket storage system includes magnetic socket storage rails with magnets within the socket holders to better retain sockets on the socket holder and socket storage rail. Socket posts of various lengths may be selectively coupled to the socket holders to further secure sockets on the socket rail.

Figure 1:
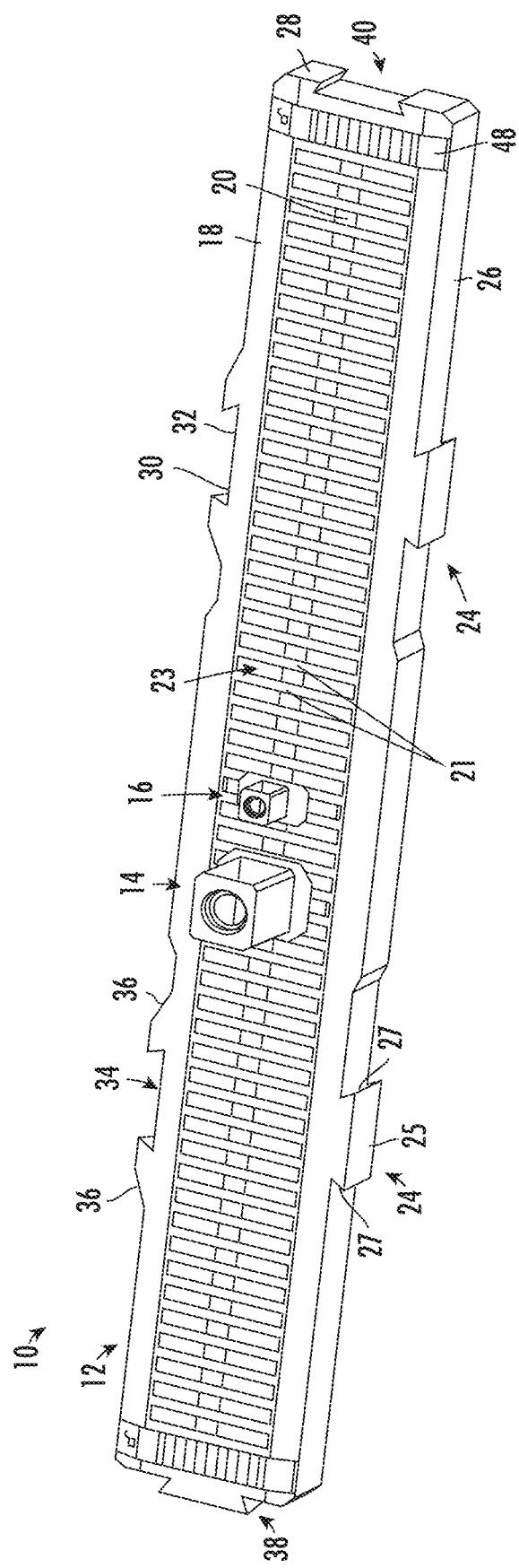
FIG. 1 is a perspective view of a socket storage system including a storage rail and socket clips, according to an exemplary embodiment.
Figure 2:
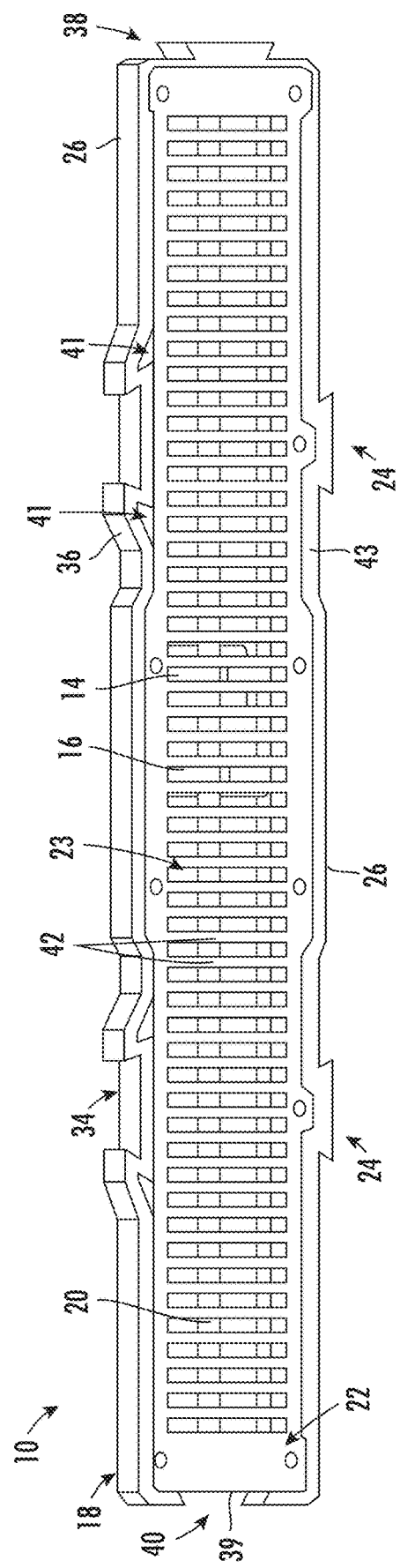
FIG. 2 is a perspective view from below of the socket storage system of FIG. 1, according to an exemplary embodiment.
Figure 3:
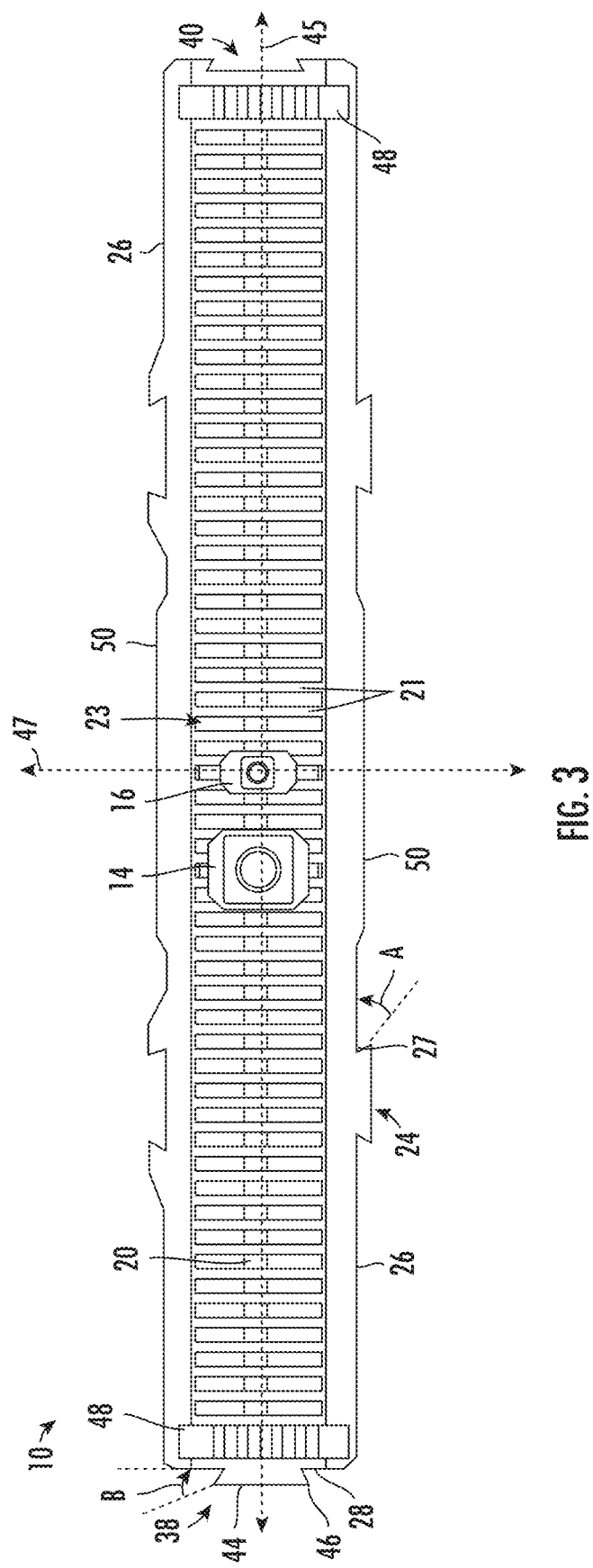
FIG. 3 is a plan view of the socket storage system of FIG. 1, according to an exemplary embodiment.

Referring to FIGS. 1-3, various aspects of a system for holding and/or storing sockets, shown as socket storage system 10 are shown. Socket storage system 10 includes a storage device, shown as socket rail 12 and various socket holders, shown as socket holder clips 14, 16. Socket rail 12 includes an upper body portion 18, a lower body portion 22, a bar shown as locking bar 20, and a sliding lock 48. Upper body portion 18 is releasably coupled to lower body portion 22. Locking bar 20 is positioned between upper body portion 18 and lower body portion 22 and extends along a major axis or longitudinal axis 45 of socket rail 12, with upper body portion 18 above and lower body portion 22 below (in the orientation shown in FIGS. 1 and 3). In a specific embodiment, socket rail 12 includes a pair of sliding locks 48. Sliding lock 48 is coupled to an end of locking bar 20.

Upper body portion 18 includes opposing longitudinal outer walls 26 extending in a generally parallel manner to major axis 45 and opposing end walls 28 extending in a parallel manner to a minor axis or transverse axis 47 of socket rail 12. In other words, opposing end walls 28 extend between and connect opposing longitudinal outer walls 26. In another embodiment, the longitudinal outer walls 26 and end walls 28 may be on an angle relative to the major axis 45 and minor axis 47 respectively. Upper body portion 18 includes a plurality of protrusions or projections, shown as dovetail attachments 24, 38. The projections or dovetail attachments 24, 28 extend outward from the outer walls 26, 28 of upper body portion 18.

In a specific embodiment, dovetail attachments 24 are positioned along at least one of the longitudinal outer walls 26 and dovetail attachment 38 is positioned along at least one of the end walls 28 (i.e., along the outer wall of upper body portion 18). In such an embodiment, the opposing end wall 28 to the end wall 28 including dovetail attachment 38 includes an end recess 40 sized and configured to receive a dovetail attachment 38 of another socket rail 12. In a specific embodiment, dovetail attachments 24 have a different size and/or dimensions than dovetail attachment 38. In another embodiment, dovetail attachments 24 may have the same size and/or dimensions as dovetail attachment 38.

Each dovetail attachment 24 includes a pair of angled side walls 27 extending from outer wall 26 on or at an angle. An outermost dovetail attachment wall 25 extends between and connects the pair of angled side walls 27. Outermost dovetail attachment wall 25 is generally parallel to outer wall 26 of socket rail 12. In a specific embodiment, the angle A between the angled side walls 27 and outer wall 26 is between 45° and 65° and more specifically between 50° and 60°. In a specific embodiment, A is about 55° (e.g., 55°±2°). In other embodiments, angle A is measure relative to the longitudinal axis 45 of socket rail 12 (e.g., in embodiments in which outer wall 26 is non-planar).

Each dovetail attachment 38 includes a pair of angled side walls 46 extending from end wall 28 on an angle. An outer attachment wall 44 extends between and connects the pair of angled side walls 46. Outer attachment wall 44 is generally parallel to end wall 28 of socket rail 12. In a specific embodiment, the angle B between the angled side walls 46 and end wall 28 is between 45° and 65° and more specifically between 50° and 60°. In a specific embodiment, angle B is about 55° (e.g., 55°±2°). In other embodiments, angle B is measure relative to the minor axis 47 of socket rail 12 (e.g., in embodiments in which end wall 28 is non-planar). In a specific embodiment, angle B is the same as angle A. In another embodiment, angle B is different from angle A.

Socket rail 12 and specifically, upper body portion 18 includes a plurality of pairs of attachment projections 36. Each pair of attachment projections 36 together at least partially define an attachment recess 34. Attachment projection pairs 36 includes a left attachment projection 36 with an inward facing (i.e., partially facing toward outer wall 26 and/or longitudinal axis 45), angled surface 30 and the opposing right attachment projection 36 includes an inward facing (i.e., partially facing toward outer wall 26 and/or longitudinal axis 45), angled surface 30. A recess wall portion 32 extends between and connects the pair of attachment projections 36 and is specifically between and connects angled surfaces 30. Recess wall portion 32 extends parallel to major axis 45 and outer walls 26 of socket rail 12.

As previously discussed, the plurality of dovetail attachments 24 and attachment recesses 34 are configured to receive and engage with dovetail attachments 24 and attachments recesses of another socket rail 12 such that the socket rails 12 can be selectively or removably coupled together. In a specific embodiment, dovetail attachments 24 and attachment recesses 34 allow for selective coupling to socket rails 12 or a tray (see e.g., 800, 900) for storage. Socket rails 12 can be coupled together along longitudinal outer walls 26 and/or end walls 28.

Figure 29:
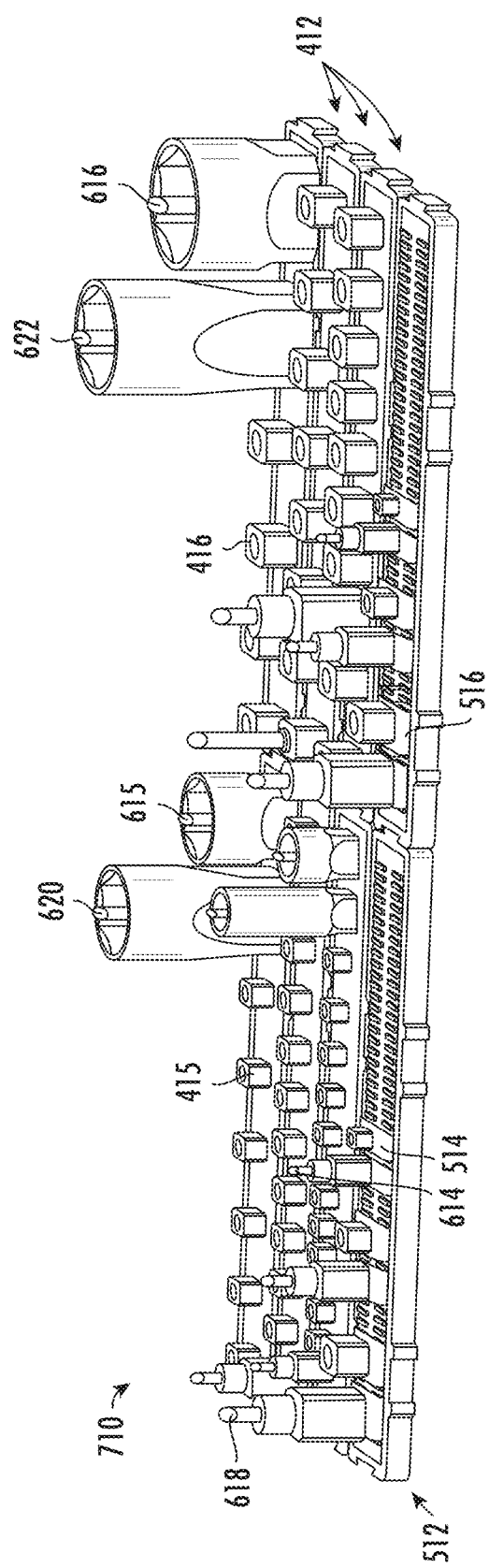
FIG. 29 is a perspective view of a socket storage system including the socket storage system of FIG. 21 and the socket storage rail of FIG. 26, according to an exemplary embodiment.
Figure 30:
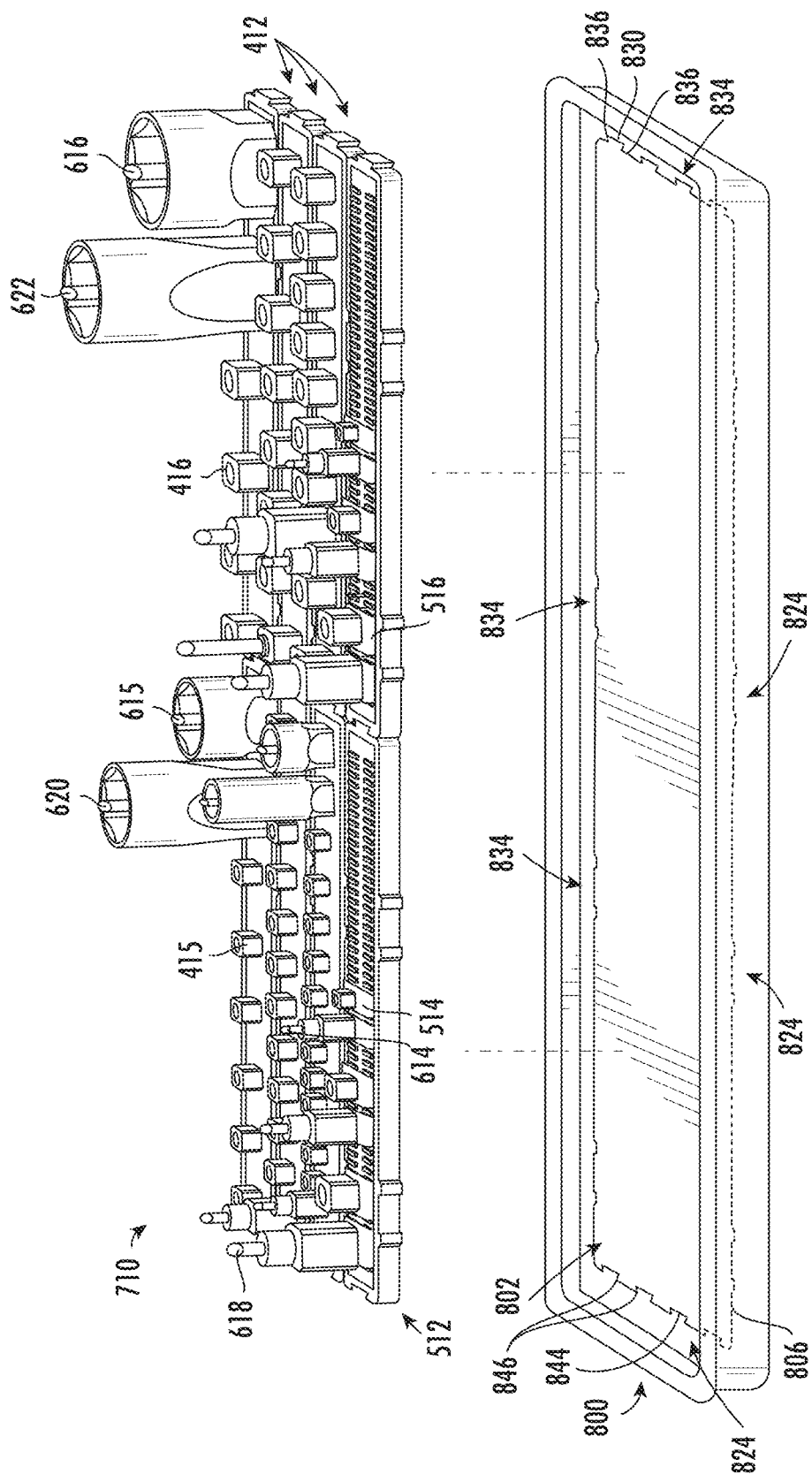
FIG. 30 is an exploded view of a socket storage kit including the socket storage system of FIG. 29, according to an exemplary embodiment.

In a specific embodiment, a socket rail 12 is coupled to another socket rail 12 along end walls 28 such that such that the longitudinal axis 45 of the first socket rail 12 is collinear with a longitudinal axis 12 of the second socket rail 12 (see e.g., FIG. 30). In a specific embodiment, socket rail 12 is coupled to another socket rail 12 along longitudinal outer walls 26 such that the longitudinal axis of the first socket rail 12 is parallel to the longitudinal axis of the second socket rail 12 (see e.g., FIG. 29).

Upper body portion 18 further includes a plurality of walls 21. The walls 21 of the upper body portion 18 are oriented across (i.e., transverse to and/or perpendicular to) the major axis 45. In specific embodiments, the plurality of walls 21 are oriented to be generally parallel to minor axis 47 of socket rail 12. As shown in FIG. 2, lower body portion 22 includes a plurality of walls 42 extending in an orientation across the major axis 45. In specific embodiments, the plurality of walls 42 are generally parallel to minor axis 47. Lower body portion 22 includes a corresponding wall 42 for each wall 21 of upper body portion 18, with walls 42 positioned below walls 21 (in the orientation shown in FIGS. 1-3). A plurality of openings or slots 23 are positioned at between adjacent walls 21 and corresponding adjacent walls 42.

In other words, the plurality of walls 21, 42 define the plurality of slots 23 between adjacent walls 21, 24. Each slot 23 is configured to receive a portion of socket holder clips 14, 16. Specifically, each slot 23 is sized and/or shaped to receive a portion of socket holder clips 14, 16. When socket holder clips 14, 16 are positioned within one of the plurality of slots 23, the socket holder clips 14, 16 extend around and engage the locking bar 20 to couple the socket holder clips 14, 16 to the socket rail 12. Socket holder clips 14, 16 are coupled to the socket rail 12 by the locking bar 20.

Referring to FIG. 2, lower body portion 22 includes opposing longitudinal side walls 43 extending across the minor axis 47 and an end wall 39 extending across the major axis 45. In specific embodiments, longitudinal side walls 43 extend in a parallel manner to major axis 45 and end wall 39 extends in a parallel manner to the minor axis 47 of socket rail 12. End wall 39 of lower body portion 22 is at least partially outward facing and positioned in end recess 40. Socket rail 12 includes a plurality of gaps or spaces 41 positioned behind (in the orientation shown in FIG. 2) attachment projections 36 and in front of at least one longitudinal side wall 43 of lower body portion 22. Referring to FIG. 3, an extended center portion 50 of upper body portion 18 extends a greater distance from major axis 45 than a distance between major axis 45 and outer wall 26. In a specific embodiment, extended center portion 50 is positioned between dovetail attachments 24 on one outer wall 26 and positioned between opposing pairs of attachment projections 36 on the opposing outer wall 26.

Figure 4:
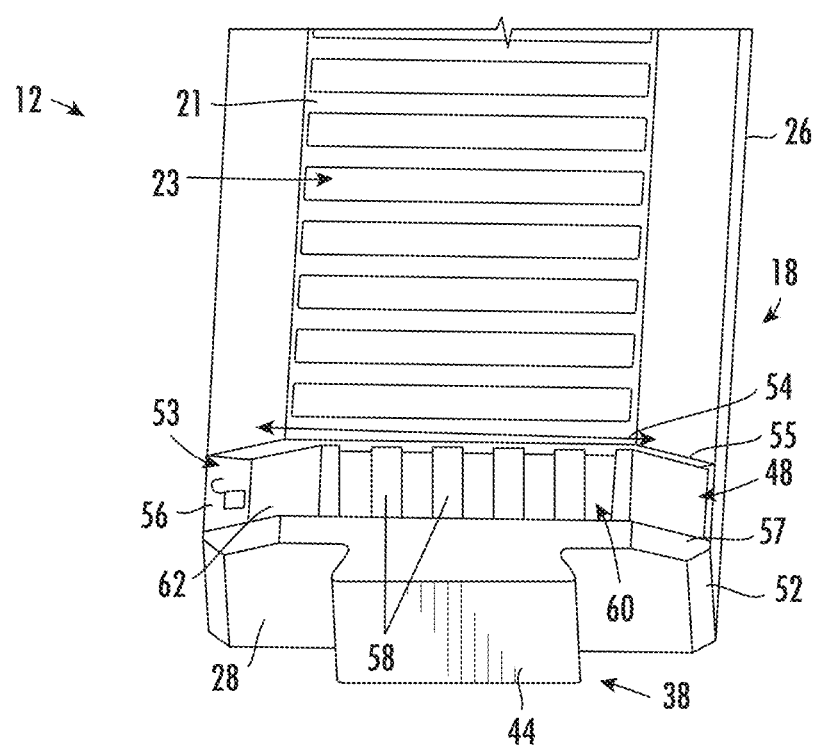
FIG. 4 is a left side perspective view of the storage rail of FIG. 1 with a sliding lock in an unlocked position, according to an exemplary embodiment.
Figure 5:
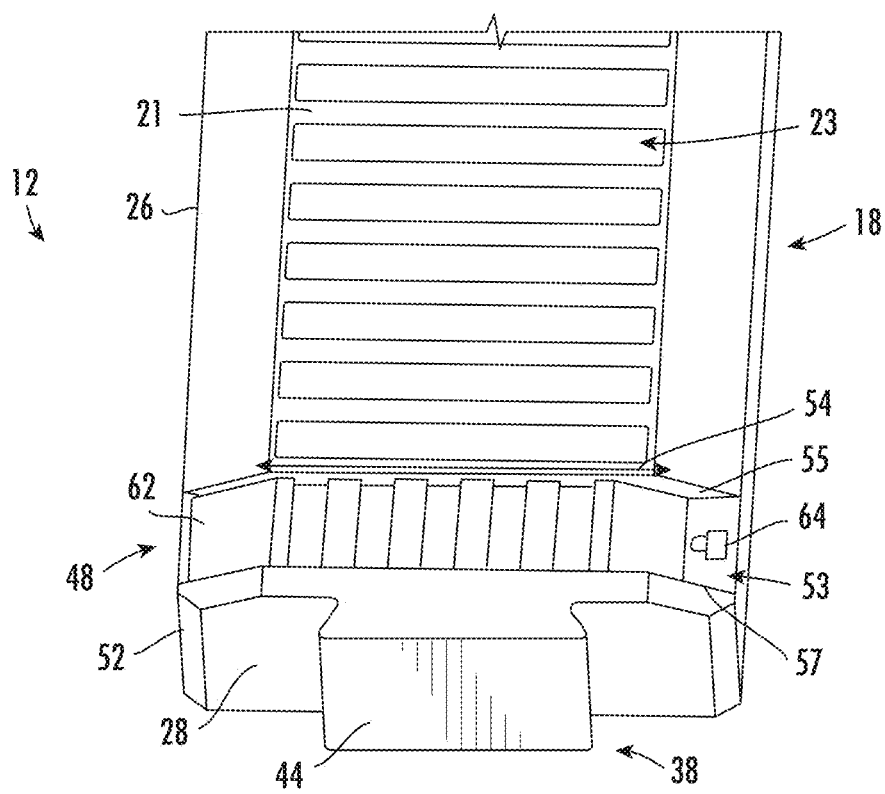
FIG. 5 is a left side perspective view of the storage rail of FIG. 1 with the sliding lock in a locked position, according to an exemplary embodiment.
Figure 6:
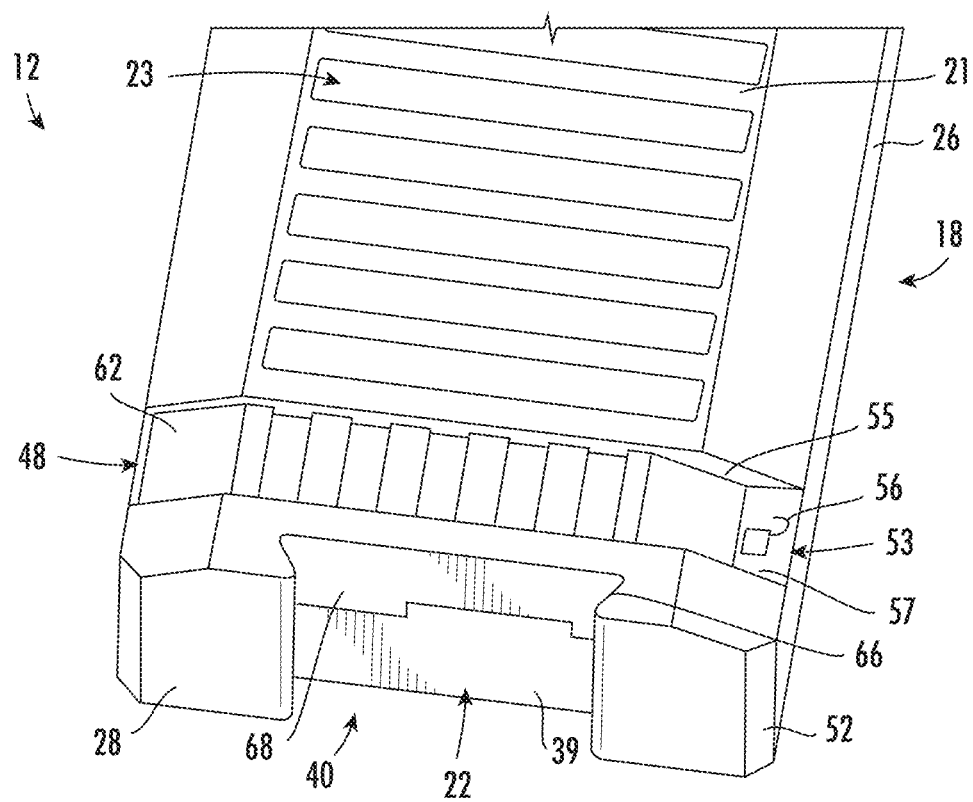
FIG. 6 is a right side perspective view of the storage rail of FIG. 1 with the sliding lock in an unlocked position, according to an exemplary embodiment.

Referring to FIGS. 4-6, detailed perspective views of the right and left ends of socket rail 12 are shown. End wall 28 is connected to opposing outer walls 26 by a pair of beveled edges 52. Sliding lock 48 slidably engages (i.e., moveable along transverse axis 47) with upper body portion 18 and is positioned within a locking recess 53. Locking recess 53 is partially defined by an opposing pair of surfaces 55, 57. Sliding lock 48 includes opposing sloped portions 62 on either side of a plurality of ridges or grips 58 and grip recesses 60. Grip recesses 60 are positioned on both sides of ridges 58. Sliding lock 48 is movable in the direction of either outer wall 26, as shown by arrow 54. Locking recess 53 further includes an indicator, shown as an open lock indicator 56 to indicate the current status of sliding lock 48. When the open lock indicator 56 is visible to the user, sliding lock 48 is in an open or unlocked position.

FIG. 4 shows sliding lock 48 in a first, unlocked position while FIG. 5 shows sliding lock 48 in a second, locked position. Locking recess 53 includes another indicator, shown as a closed lock indicator 64. The open lock indicator 56 and the closed lock indicator 64 may be applied through a sticker or laser etching. As will be discussed in greater detail below, when sliding locks 48 are in a locked position, locking bar 20 is pushed into a position that prevents socket holder clips 14, 16 from being removed from socket rail 12. When sliding locks 48 are in an unlocked position, locking bar 20 is positioned between the legs of the socket holder clips 14, 16 so that they can be removed from the socket rail 12.

Referring to FIG. 6, a detailed perspective view of the right end of socket rail 12 is shown. A portion of end wall 39 of lower body portion 22 is outward facing and positioned in end recess 40. A corresponding recess wall 68 is parallel to end wall 28 of upper body portion 18 and end wall 39 of lower body portion 22. A pair of opposing angled walls 66 extend from recess wall 68 and connect to end wall 28.

Figure 7:
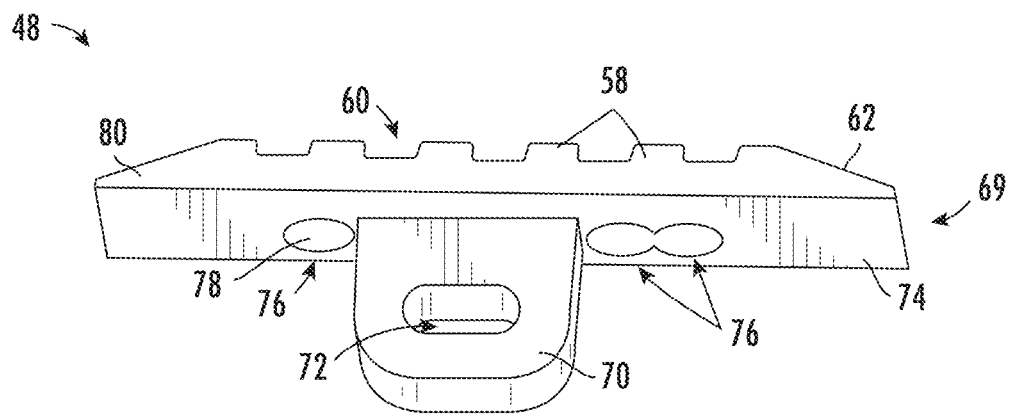
FIG. 7 is a detailed perspective view of the sliding lock of the storage rail, according to an exemplary embodiment.

Referring to FIG. 7 a detailed perspective view of sliding lock 48 is shown, according to an exemplary embodiment. Sliding lock 48 includes an upper portion 69 and a tab 70 that extends downward toward lower body portion 22 of socket rail 12. A slot 72 extends through tab 70. Slot 72 is configured to receive a portion of locking bar 20 (see e.g., FIGS. 8 and 10). Upper portion 69 includes a lower surface 74 where upper portion 69 is coupled to tab 70 and a pair of side surfaces 80. Side surfaces 80 interface with opposing surfaces 55, 57 of locking recess 53 as sliding lock 48 is moved. Lower surface 74 includes a plurality of recesses 76 having curved inner surfaces 78. In a specific embodiment, one recess 76 is positioned on the side of tab 70 of sliding lock 48 adjacent to open lock indicator 56 and two recesses 76 are positioned on the opposing side of tab 70 adjacent to closed lock indicator 64.

Figure 8:
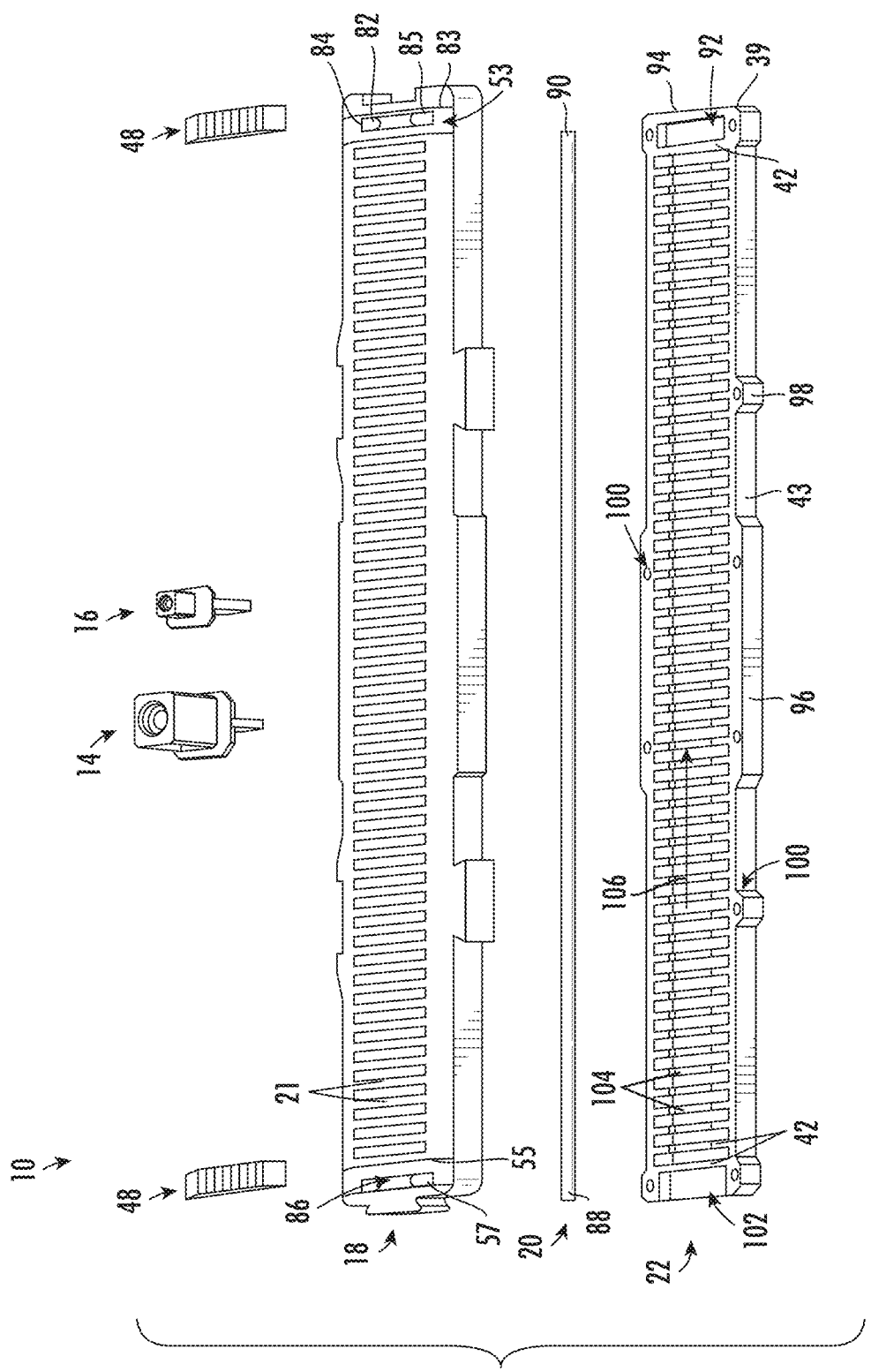
FIG. 8 is an exploded view of the socket storage system of FIG. 1, according to an exemplary embodiment.

As shown in FIG. 8, within locking recess 53, upper body portion 18 includes an opening 86 extending though upper body portion 18. A pair of bars 84, 85 protrude from edges 83 of opening 86. The end of each bar 84, 85 that is distal from edges 83 include a protrusion 82. In a specific embodiment, bar 85 extends from the edge 83 adjacent to closed lock indicator 64 and has a first length while bar 84 extend from the edge 83 adjacent to the open lock indicator 56 and has a second length. In such an embodiment, the first length is greater than the second length. In a specific embodiment, the plurality of recesses 76 and the protrusions 82 have the shape of a partial sphere. When sliding lock 48 is positioned in the unlocked position (see e.g., FIG. 4) the bar 85 is positioned over both of the recesses 76 adjacent to closed lock indicator 64 such that protrusion 82 is received within the recess 76 closer to tab 70 of sliding lock 48. When in this position, the opposing protrusion 82 and bar 84 interfaces with lower surface 74 of sliding lock 48 and not the recess 76. When sliding lock 48 is in the locked position (see e.g., FIG. 5) sliding lock 48 is moved over so that protrusion 82 of bar 85 is received within the recess 76 farther away from tab 70 on one side and within the only recess 76 on the other side of tab 70 (i.e., protrusion 82 of bar 84 is positioned within the recess). When in this locked position, both protrusions 82 interface with the curved inner surfaces 78 of the recesses 76, providing resistance to moving the sliding lock 48 and the locking bar 20.

Referring to FIG. 8, an exploded view of socket storage system 10 is shown, according to an exemplary embodiment. Locking bar 20 includes a first end 88 and a second end 90 that opposes the first end 88. First end 88 and second end 90 are each received within a slot 72 of the sliding locks 48 (see e.g., FIG. 10). When the sliding locks 48 are in operating condition, the tabs 70 extend through the openings 86 in upper body portion 18 and the upper portion 69 is received within locking recess 53.

Lower body portion 22 includes a cavity 92 defined between the last wall 42 and the end wall 39. End wall 39 further includes an upper extension 94 that extends away from end wall 39 toward upper body portion 18. Upper extension 94 of end wall 39 is positioned in a generally central position between longitudinal side walls 43 and provides a barrier to prevent locking bar 20 from moving outside of socket rail 12. Lower body portion 22 further includes an extended center portion 96 that extends a greater distance from major axis 45 than a distance between major axis 45 and longitudinal side walls 43. The position of extended center portion 96 corresponds to the position of extended center portion 50 of upper body portion 18. In a specific embodiment, extended center portion 96 is positioned between side projections 98 which correspond to the position of dovetail attachments 24 on upper body portion on one longitudinal side wall 43.

Lower body portion 22 includes a plurality of cylindrical recesses 100 configured to receive the plurality of cylinders 112 (see e.g., FIG. 9) that extend downward (in the orientation of FIG. 1) from upper body portion 18. When cylinders 112 are received within cylindrical recesses 100, upper body portion 18 is coupled to lower body portion 22. Lower body portion 22 further includes an open sided cavity 102 partially defined by the last wall 42 on the end of lower body portion 22 that opposes cavity 92. When assembly as socket rail 12, open sided cavity is enclosed by end wall 28 and dovetail attachment 38 of upper body portion 18.

Figure 9:
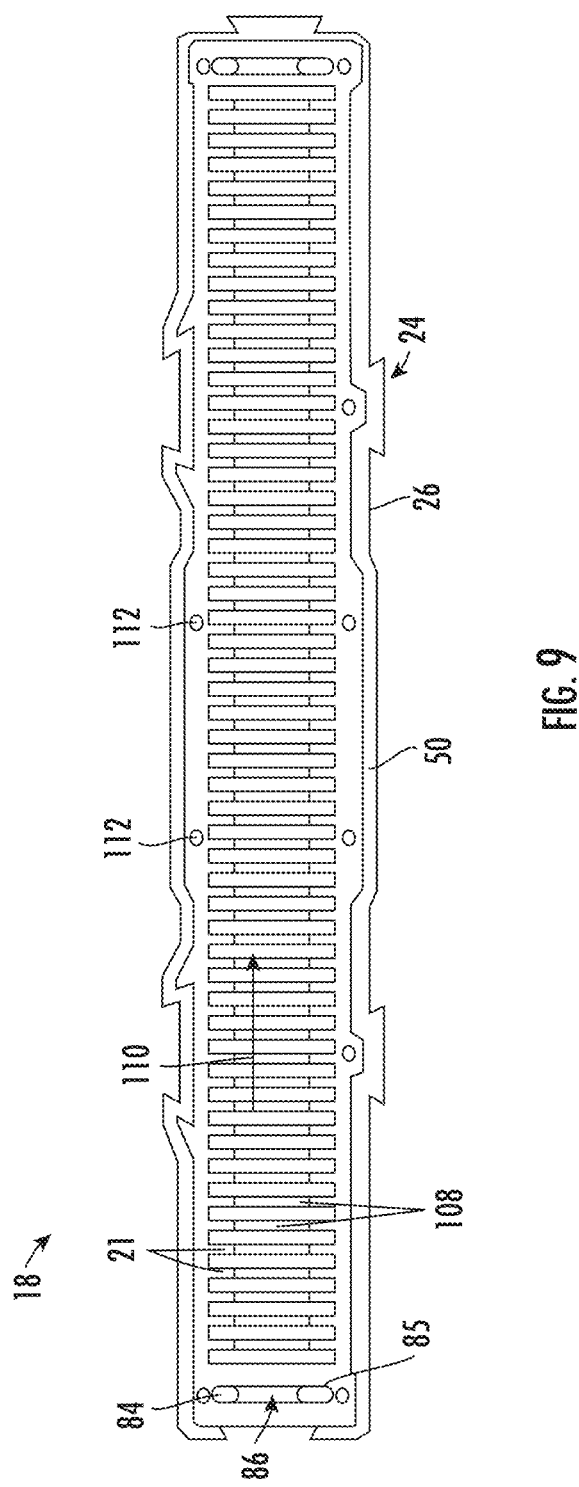
FIG. 9 is a detailed perspective view from below of an upper portion of the storage rail of FIG. 1, according to an exemplary embodiment.

Referring to FIGS. 8-9, upper body portion 18 and lower body portion 22 together enclose locking bar 20. Lower body portion 22 and specifically the plurality of walls 42 each include a cut out section 104. In a specific embodiment, the cut out sections 104 have a generally rectangular shape. The cut out sections 104 create an area or space 106 that extends across lower body portion 22 between open sided cavity 102 and cavity 92. As shown in FIG. 9, the walls 21 of upper body portion 18 have corresponding cut out sections 108. In a specific embodiment, the cut out sections 108 have a generally rectangular shape. The cut out sections 108 create an area or space 110 that extends across upper body portion 18 between the pair of openings 86.

Figure 10:
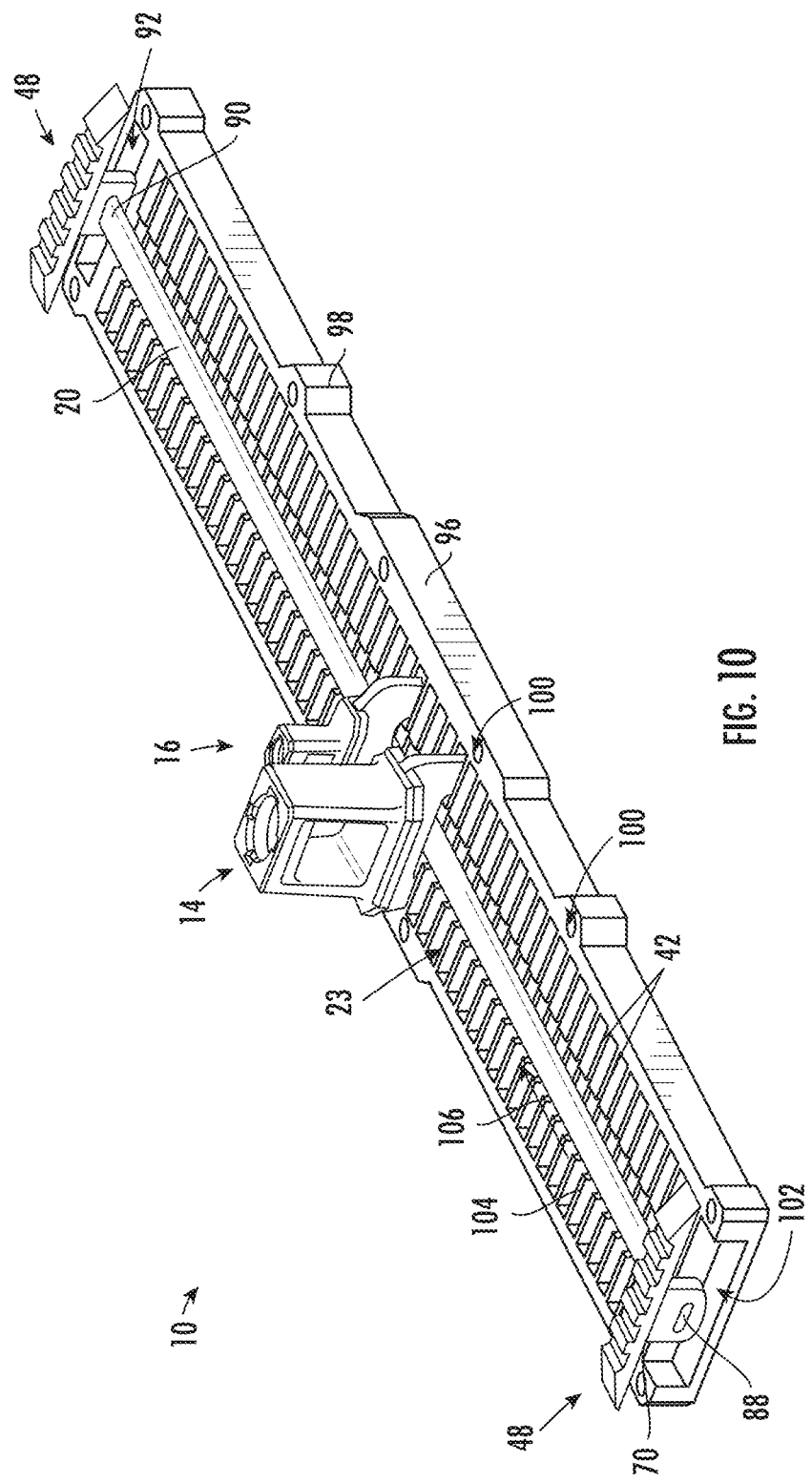
FIG. 10 is a perspective view of the socket storage system of FIG. 1 with the upper portion of the storage rail removed, according to an exemplary embodiment.

Referring to FIG. 10, a perspective view of the socket storage system 10 with the upper body portion 18 of socket rail 12 removed is shown, according to an exemplary embodiment. First end 88 of locking bar 20 extends through slot 72 of the sliding lock 48 with its tab 70 extending downward into open sided cavity 102. The second end 90 of locking bar 20 extends through slot 72 of the opposing sliding lock 48 with its tab 70 received within cavity 92 of lower body portion 22 of socket rail 12. The remainder of locking bar 20 is positioned at least partially within cut out section 104 of walls 42 and when socket rail 12 is assembled cut out sections 108 of upper body portion 18 (see e.g., FIG. 9). Socket holder clips 14, 16 are positioned within their own discrete slots 23 with their clip portions 120, 142 (see e.g., FIGS. 11-12) surrounding locking bar 20. When a user moves sliding locks 48 toward closed lock indicator 64 locking bar 20 is moved in the same direction as the sliding locks 48 within cut out sections 104 and cut out sections 108. As will be described in greater detail below, the movement of locking bar 20 secures socket holder clips 14, 16 to socket rail 12.

Figure 11:
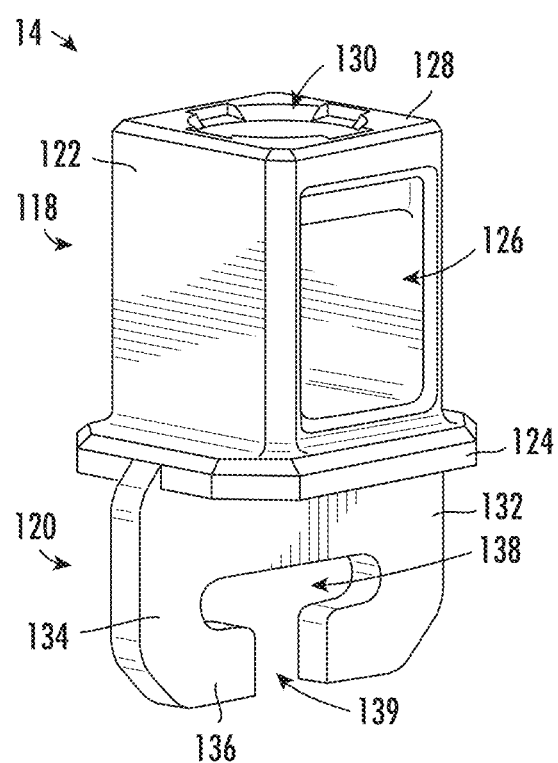
FIG. 11 is a detailed perspective view of a large socket clip, according to an exemplary embodiment.
Figure 12:
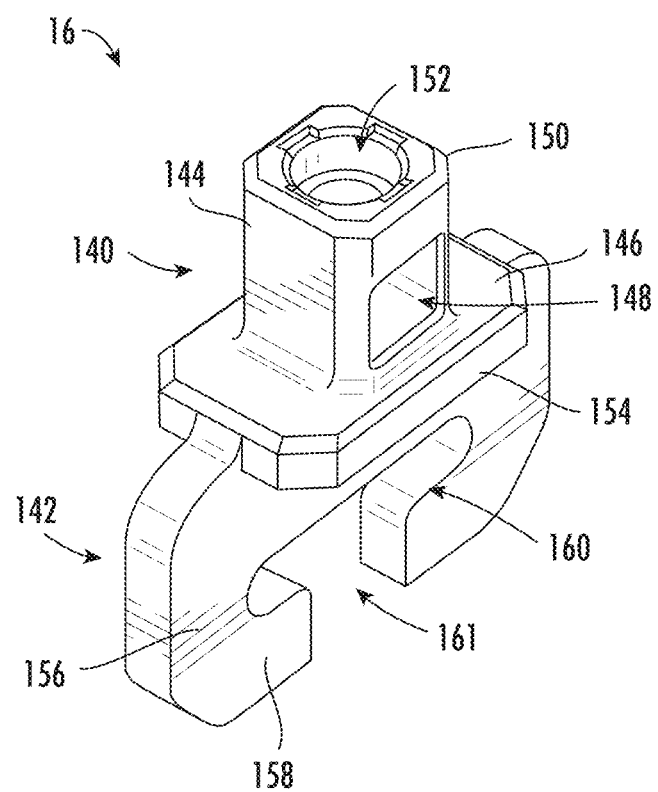
FIG. 12 is a detailed perspective view of a small socket clip, according to an exemplary embodiment.

Referring to FIGS. 11-12, details of two socket holder clips 14, 16 are shown according to an exemplary embodiment. Socket holder clips 14, 16 can be removably coupled to socket rail 12. Socket holder clip 14 includes a neck portion 118 and a clip portion 120 coupled to the neck portion 118. Neck portion 118 includes an upper portion 122, a base 124, and a top surface 128 on an end opposing base 124. Upper portion 122 includes a cavity 126 that extends through upper portion 122. Top surface 128 of neck portion 118 includes a through hole 130 defined in top surface 128 that connects to cavity 126. Through hole 130 is configured to receive and secure a rod or post (see e.g., element 217 of FIG. 13 and FIG. 28) which a socket can extend around. The post extends away from the top surface 126 of the neck portion 118 when assembled with the socket clip 14.

Base 124 couples to clip portion 120. Clip portion 120 extend downward or axially away from neck portion 118. Clip portion 120 includes a continuous or solid upper portion 132 adjacent to base 124 and a pair of side components or legs 134. Each leg 134 is curved, extending into an inward extension 136. An opening (i.e., narrow or elongated opening) or slot 138 is positioned between the pair of legs 134 with a gap or opening 139 defined between the opposing inward extensions 136 of clip portion 120 and positioned below (i.e., in direction of lower body portion 22) opening 138. The opening 138 is positioned between a bottom of the neck portion 118 and the opposing inward extensions 136. Gap 139 is defined between the opposing inner surfaces (i.e., surfaces facing base 124) of the inward extensions 136 and positioned below the opening 138 and connected to the opening 138.

Opening or slot 138 of socket holder clip 14 is configured and/or sized to receive locking bar 20. Neck portion 118 is configured to hold a socket. In a specific embodiment, neck portion 118 is sized to hold a socket having a ½ inch size. In other embodiments, socket holder clips can be sized to hold various other standard socket sizes (e.g., ⅜ inch socket, ¾ inch socket etc.).

In general, socket holder clip 16 is substantially the same as socket holder clip 14 except for the differences discussed herein. Socket holder clip 16 includes a neck portion 140 and a clip portion 142. Neck portion 140 includes an upper portion 144, a base 146, and a top surface 150 on an end opposing base 146. Upper portion 144 includes a cavity 148 that extends through upper portion 144. Top surface 150 of neck portion 140 includes a through hole 152 that connects to cavity 148. Through hole 152 is configured to receive a rod or post (see e.g., element 217 of FIG. 13 and FIG. 28) which a socket can extend around. Base 146 couples to clip portion 142. Clip portion 142 includes a continuous or solid upper portion 154 adjacent to base 146 and a pair of side components or legs 156. Each leg 156 is curved, extending into an inward extension 158. An opening or slot 160 is positioned between the pair of legs 156 with a gap or opening 161 defined between the opposing inward extensions 158 of clip portion 142. Slot 160 of socket holder clip 16 is configured to receive locking bar 20. Neck portion 140 is configured to hold a socket. In a specific embodiment, neck portion 140 is sized to hold a socket having a ¼ inch size.

As previously discussed, sliding lock 48 is moveable between the unlocked position in which socket holder clips 14, 16 are removeable from socket rail 12 and the locked position in which the locking bar 20 engages the socket holder clips 14, 16 to secure the socket holder clips 14, 16 to the socket rail 12. When sliding lock 48 is moved into either the locked position or the unlocked position, locking bar 20 is translated in a direction perpendicular to longitudinal axis 45.

When a user moves sliding locks 48 into a locked position, locking bar 20 moves from being positioned within the opening 138, 160 above (i.e., in direction facing upper body portion 18) opening or gap 139 of clip portion 120 and opening or gap 161 of clip portion 142 to being at least partially above the inward extensions 136 and 158 of socket holder clips 14 and 16 respectively, securing the socket holder clips 14, 16 to socket rail 12. In other words, in the unlocked position the relative position of the gaps 139, 161 allow a user to pull upwards (i.e., away from socket rail 12) on the socket holder clips 14, 16 while in the locked position, the relative positioning of locking bar 20 causes engagement and/or resistance between inward extensions 136, 158 and locking bar 20 such that socket holder clips 14, 16 are secured to socket rail 12.

Figure 13:
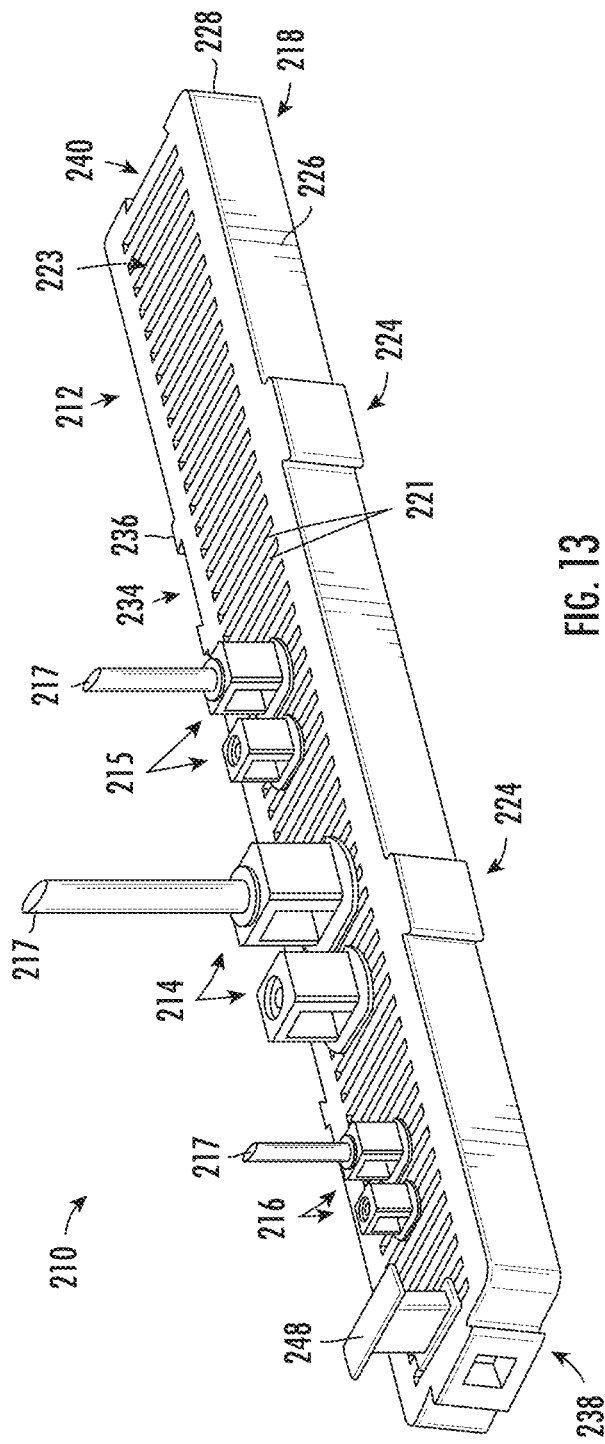
FIG. 13 is a perspective view of a socket storage system including a storage rail and socket holders, according to another exemplary embodiment.
Figure 14:
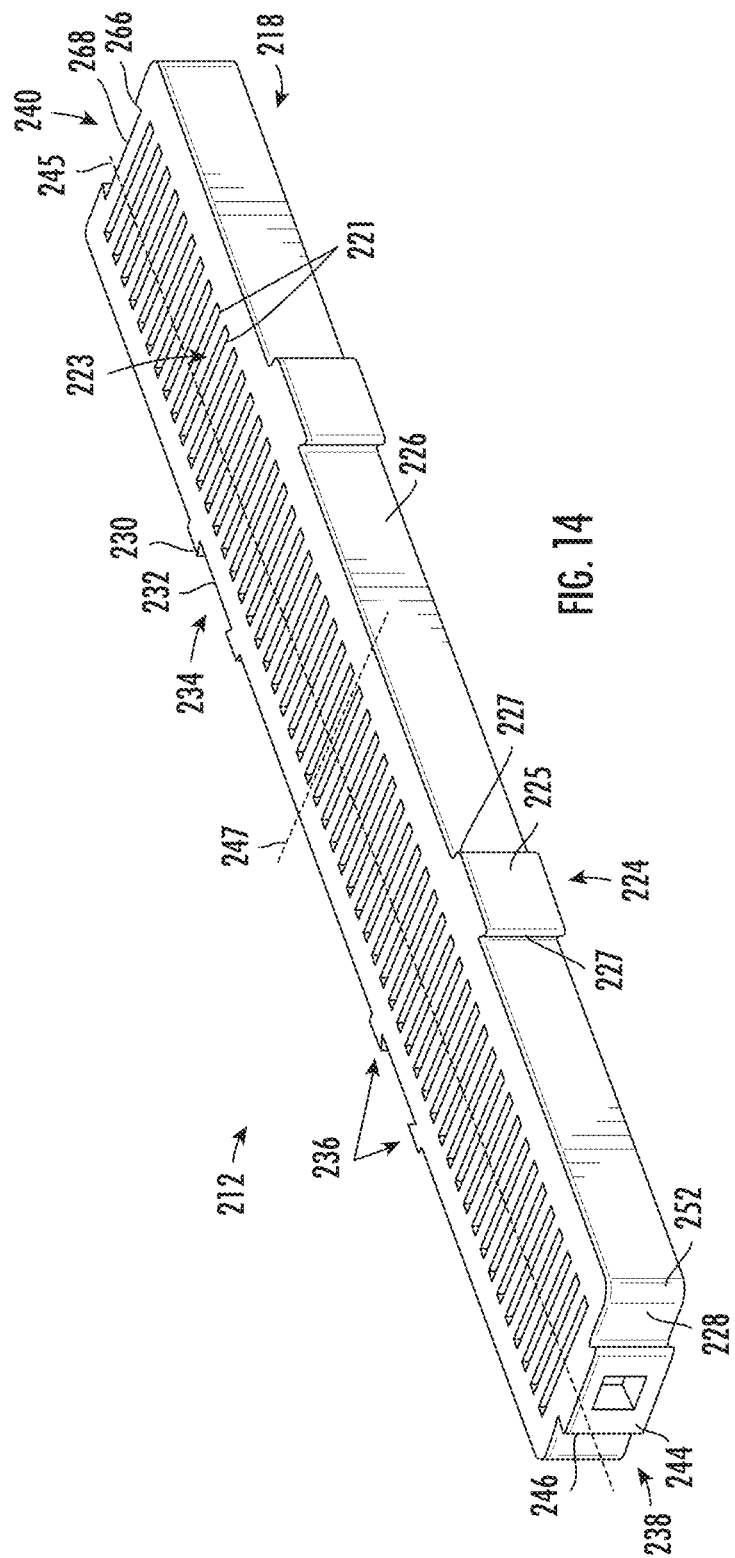
FIG. 14 is a perspective view of the socket storage rail of FIG. 13, according to an exemplary embodiment.

Referring to FIGS. 13-20, various aspects of a system for holding and/or storing sockets, shown as socket storage system 210 are shown. In general, socket storage system 210 is substantially the same as socket storage system 10 except for the differences discussed herein. Referring to FIGS. 13-15, socket storage system 210 includes a storage device, shown as socket rail 212 and various socket holders, shown as socket holders 214, 215, 216. Socket rail 212 includes body portion 218, a locking bar 220, and one or more handles 248. In a specific embodiment, body portion 218 is a single integral component. In another embodiment, body portion 218 may include an upper body portion and a lower body portion that are releasably coupled together. Locking bar 220 is positioned within body portion 218 and extends along a major axis 245 of socket rail 212.

Body portion 218 includes opposing longitudinal outer walls 226 extending across a minor axis 247 and opposing end walls 228 extending across major axis 245. In other embodiments, opposing longitudinal outer walls 226 extend in a parallel manner to major axis 245 and opposing end walls 228 extending in a parallel manner to minor axis 247 of socket rail 212. Body portion 218 includes a plurality of protrusions or projections, shown as dovetail attachments 224, 238. In a specific embodiment, dovetail attachments 224 are positioned along at least one of the longitudinal outer walls 226 and dovetail attachment 238 is positioned along at least one of the end walls 228. In such an embodiment, the opposing end wall 228 to the end wall 228 including dovetail attachment 238 includes an end recess 240 sized and configured to receive a dovetail attachment 238 of another socket rail 212. In a specific embodiment, dovetail attachments 224 have a different size and/or dimensions than dovetail attachment 238. In another embodiment, dovetail attachments 224 may have the same size and/or dimensions as dovetail attachment 238.

Each dovetail attachment 224 includes a pair of angled side walls 227 extending from outer wall 226 on an angle. An outermost dovetail attachment wall 225 extends between and connects the pair of angled side walls 227. Outermost dovetail attachment wall 225 is generally parallel to outer wall 226 of socket rail 212. Each dovetail attachment 238 includes a pair of angled side walls 246 extending from end wall 228 on an angle. An outer attachment wall 244 extends between and connects the pair of angled side walls 246. Outer attachment wall 244 is generally parallel to end wall 228 of socket rail 212.

Socket rail 212 and specifically, body portion 218 includes a plurality of pairs of attachment projections 36. Each pair of attachment projections 236 together at least partially define an attachment recess 234. Attachment projection pairs 236 includes a left attachment projection 236 with an inward facing (i.e., facing toward outer wall 226), angled surface 230 and the opposing right attachment projection 236 includes an inward facing (i.e., facing toward outer wall 226), angled surface 230. A recess wall portion 232 extends between the pair of attachment projections 236 and specifically between angled surfaces 230. Recess wall portion 232 extends parallel to major axis 245 and outer walls 226 of socket rail 212.

Body portion 218 further includes a plurality of walls 221. The walls 221 are oriented to extend across major axis 245. In specific embodiments, the plurality of walls 221 are oriented to be generally parallel to minor axis 247 of socket rail 212. A plurality of openings or slots 223 are positioned at between adjacent walls 221 Each slot 223 is sized to receive a portion of socket holders 214, 215, 216 of various sizes and one or more handles 248.

Referring to FIGS. 15-16, perspective views of the locking bar 220 and an end cap 250 are shown, according to an exemplary embodiment. Locking bar 220 includes a first end 288 and a second end 290 that opposes the first end 288. First end 288 and second end 290 are each received within an opening or bore 253 of a respective end cap 250. Each opening 253 is defined on an inward facing (e.g., facing minor axis 247) surface of end cap 250. In a specific embodiment, locking bar 220 has a circular cross-sectional shape. In another embodiment, locking bar 220 may have a different cross-sectional shape (i.e., square, rectangular, oval).

Figure 17:
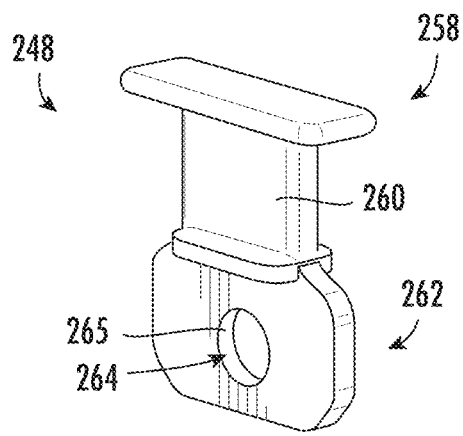
FIG. 17 is a detailed perspective view of a handle of the socket storage system of FIG. 13, according to an exemplary embodiment.
Figure 18:
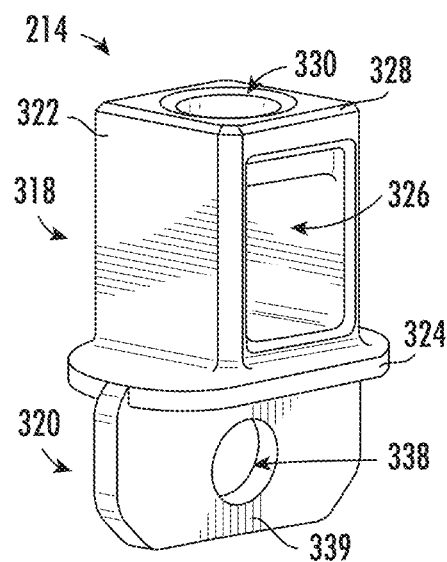
FIG. 18 is a detailed perspective view of a large socket clip of the socket storage system of FIG. 13, according to an exemplary embodiment.
Figure 19:
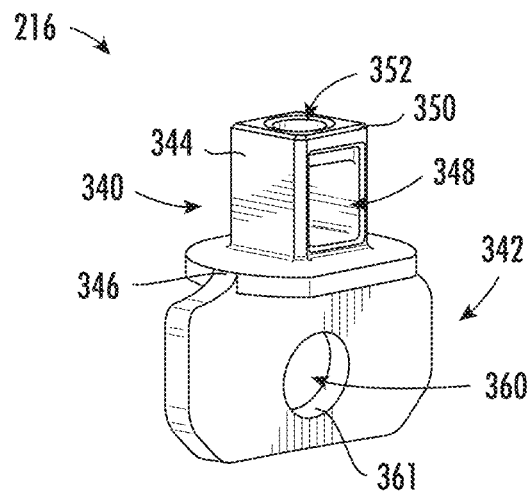
FIG. 19 is a detailed perspective view of a small socket clip of the socket storage system of FIG. 13, according to an exemplary embodiment.
Figure 20:
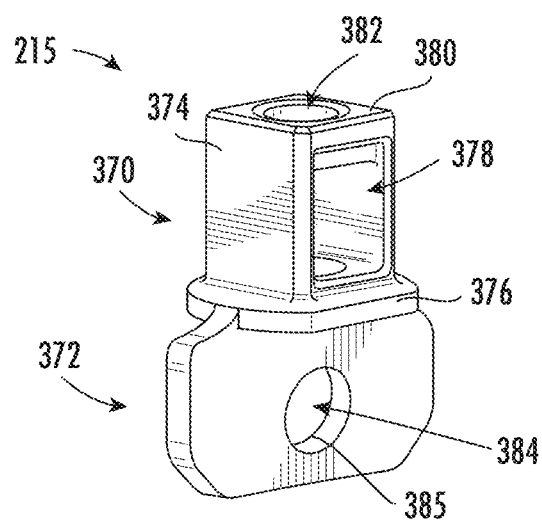
FIG. 20 is a detailed perspective view of a medium socket clip of the socket storage system of FIG. 13, according to an exemplary embodiment.

Referring to FIG. 17, a perspective view of handle 248 is shown, according to an exemplary embodiment. Handle 248 includes a gripping portion 258, an extended portion 260 and a connection portion 262. Connection portion 262 includes a through hole 264 with an inner surface 265. Through hole 264 receives and engages with locking bar 220 to hold handle 248 on socket rail 212. Referring to FIGS. 18-20, details of socket holders 214, 215, and 216 are shown according to an exemplary embodiment. Socket holders 214, 215 and 216 are substantially the same as socket holder clips 14, 16 except for the respective connection portions 320, 342, 372 which are formed and interact with locking bar 220 in the same way as connection portion 262 of handle 248. In a specific embodiment, the neck portion 318 of socket holder 214 is sized to hold a socket having a ½ inch size. In a specific embodiment, the neck portion 340 of socket holder 216 is sized to hold a socket having a ¼ inch size. In a specific embodiment, the neck portion 370 of socket holder 215 is sized to hold a socket having a ⅜ inch size.

Figure 21:
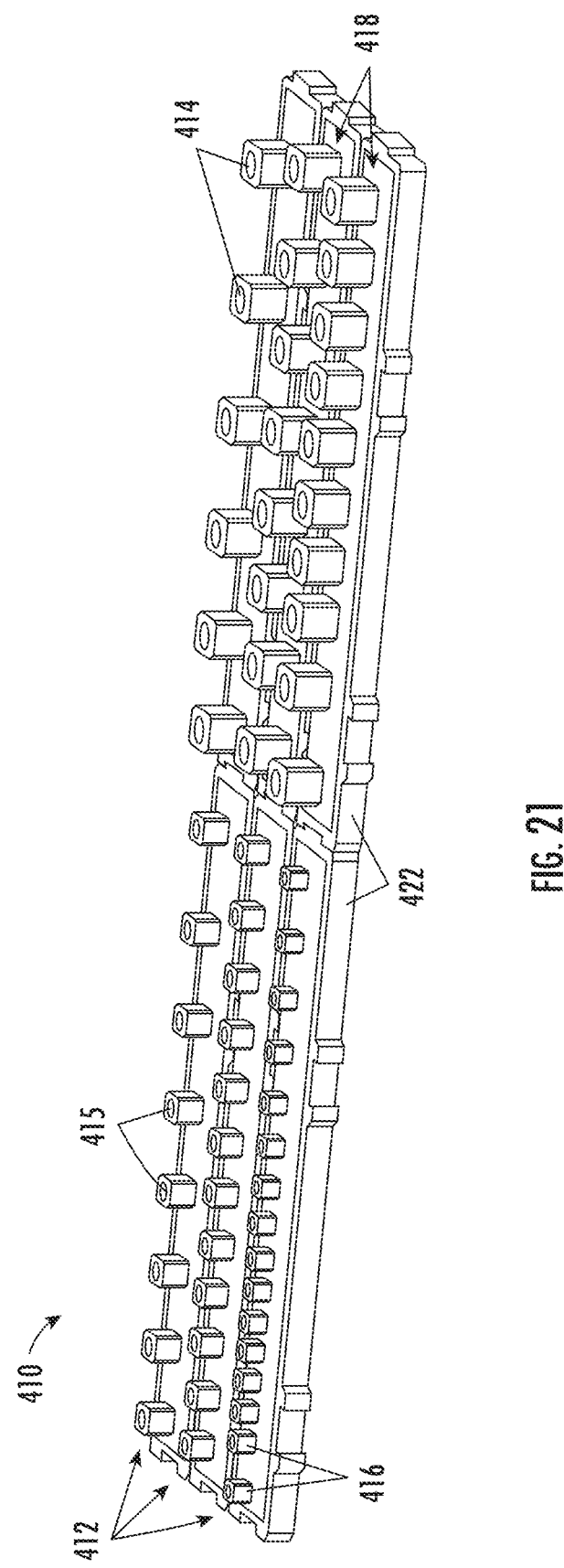
FIG. 21 is a perspective view of a socket storage system including a storage rail and socket holders, according to another exemplary embodiment.
Figure 22:
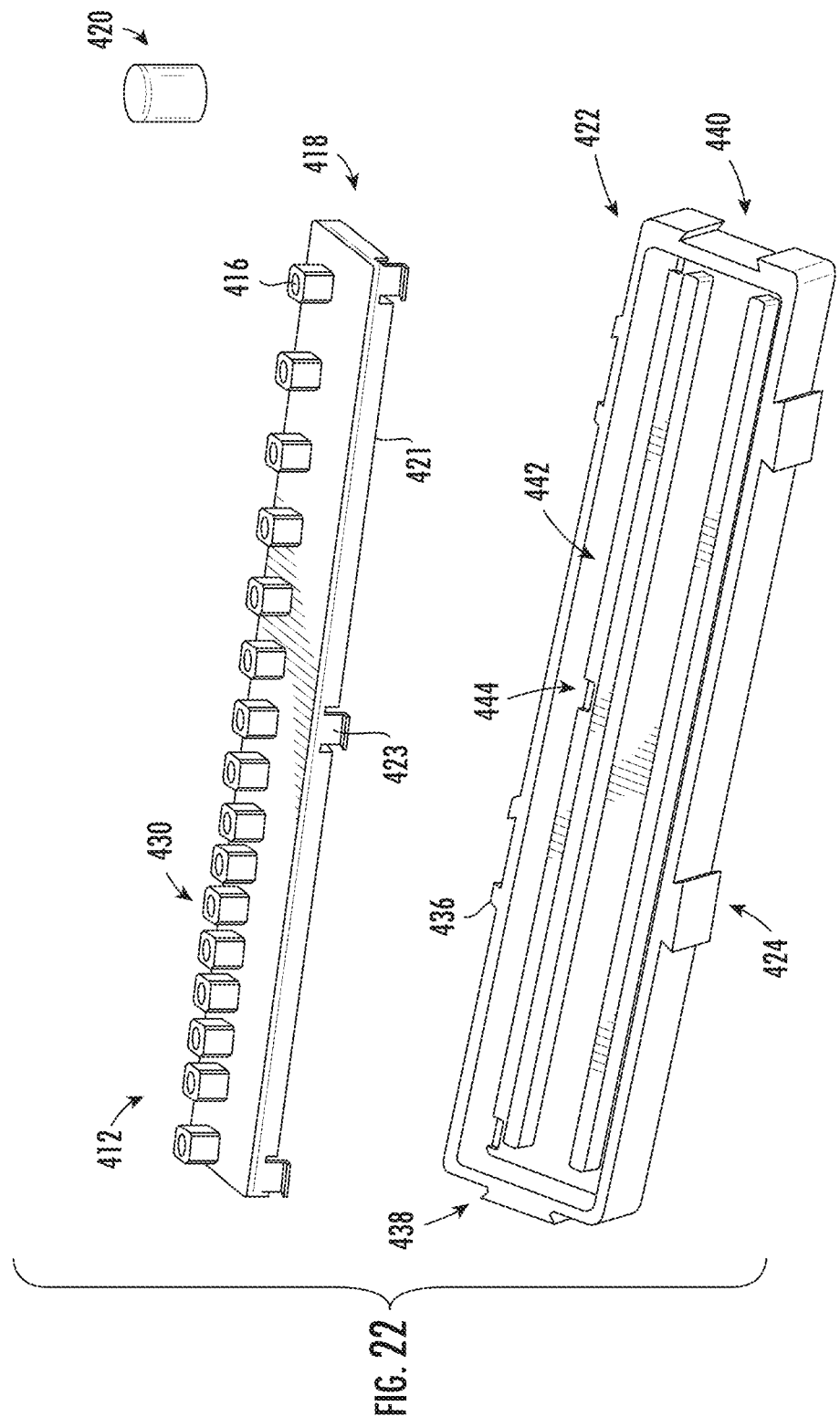
FIG. 22 is an exploded view of a socket storage rail of the socket storage rail of FIG. 21, according to an exemplary embodiment.
Figure 23:
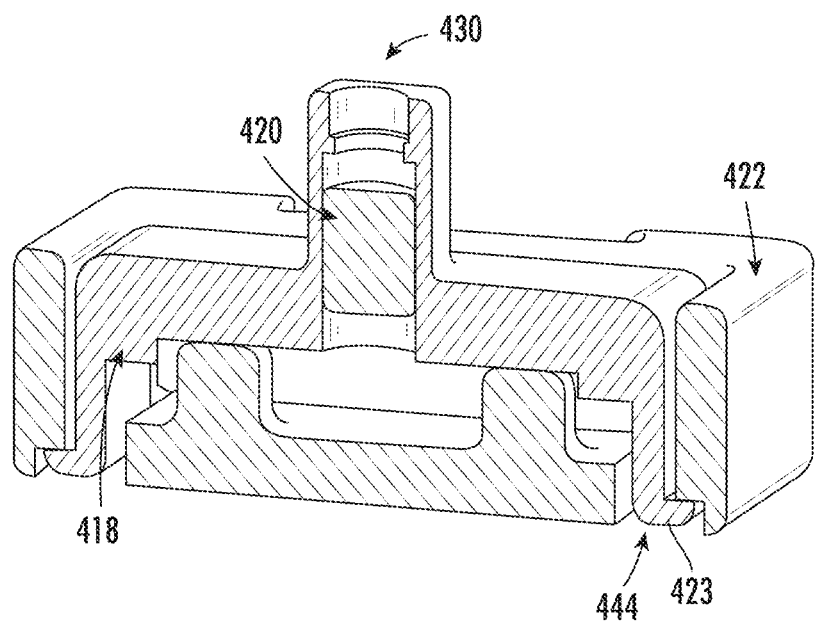
FIG. 23 is a cross-sectional view of a socket storage holder of the socket storage rail of FIG. 21, according to an exemplary embodiment.
Figure 24:
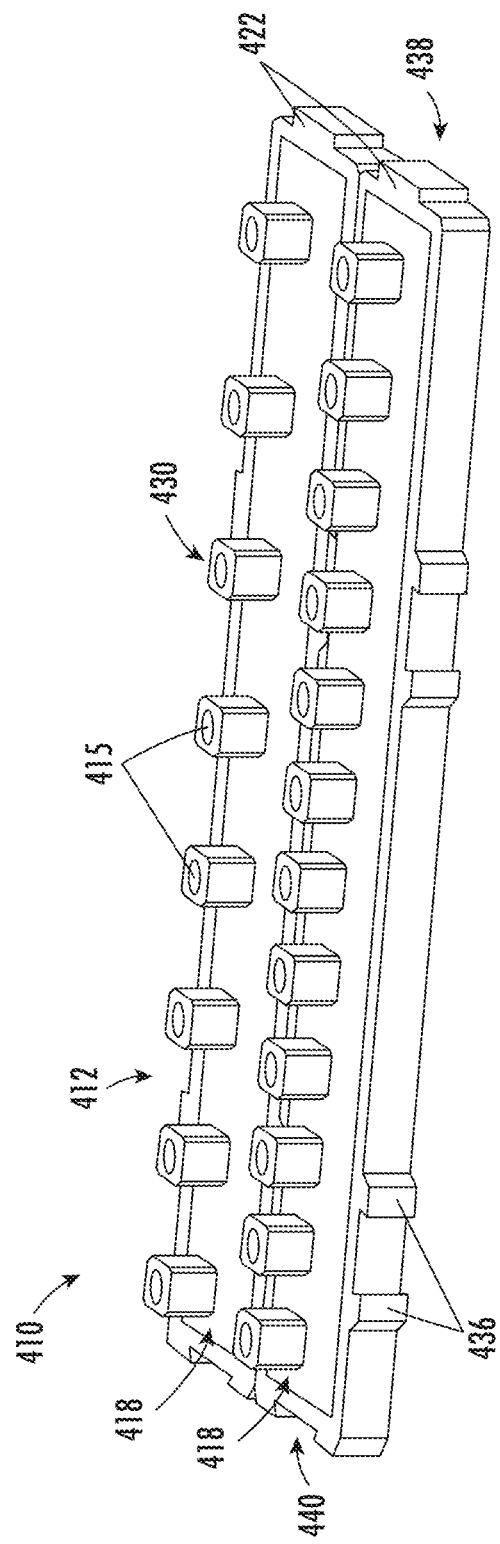
FIG. 24 a perspective view of a portion of the socket storage rail of FIG. 21, according to an exemplary embodiment.
Figure 25:
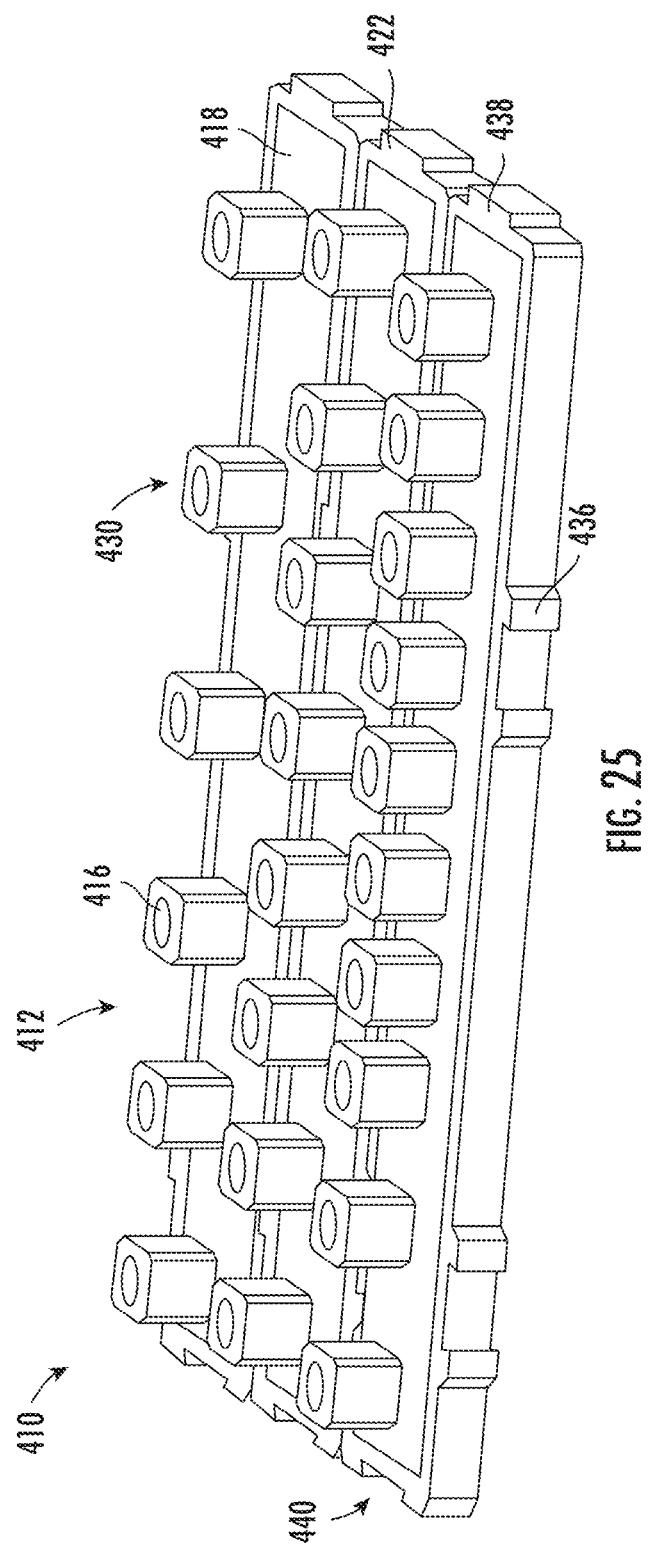
FIG. 25 is a perspective view of another portion of the socket storage rail of FIG. 21, according to an exemplary embodiment.

Referring to FIGS. 21-25 various aspects of a system for holding and/or storing sockets, shown as magnetic socket storage system 410 are shown. Socket storage system 410 includes a storage device, shown as socket rail 412 and socket holders of various sizes, shown as socket holders 414, 415, 416. Socket rail 412 includes a magnetic body portion 418, a base 422 and a plurality of magnets 420. In a specific embodiment, magnetic body portion 418 is a single integral component including socket holders 414, 415, or 416. As shown in FIG. 21, the spacing between the socket holders on the magnetic body portion 418 can be varied.

Magnetic body portion 418, and specifically each socket holder 414, 415, or 416 includes a magnet 420 pressed into the socket holder. Each socket holder 414, 415, or 416 includes a through hole 430 configured to receive a socket post or rod (see e.g., FIG. 28). Magnetic body portion 418 further includes opposing side walls 421 extending downward (in the orientation of FIGS. 21 and 22). Side walls 421 are not continuous and include a plurality of clips 423. When assembled, magnetic body portion 418 is received within the cavity 442 of base 422 and clips 423 are received within openings 444 to couple and/or snap magnetic body portion 418 onto base 422. The connection between socket rails 412 is substantially the same as socket rails 12 and 212 including a plurality of dovetail attachments 424, 438 allowing for the creation of a modular storage system.

Figure 26:
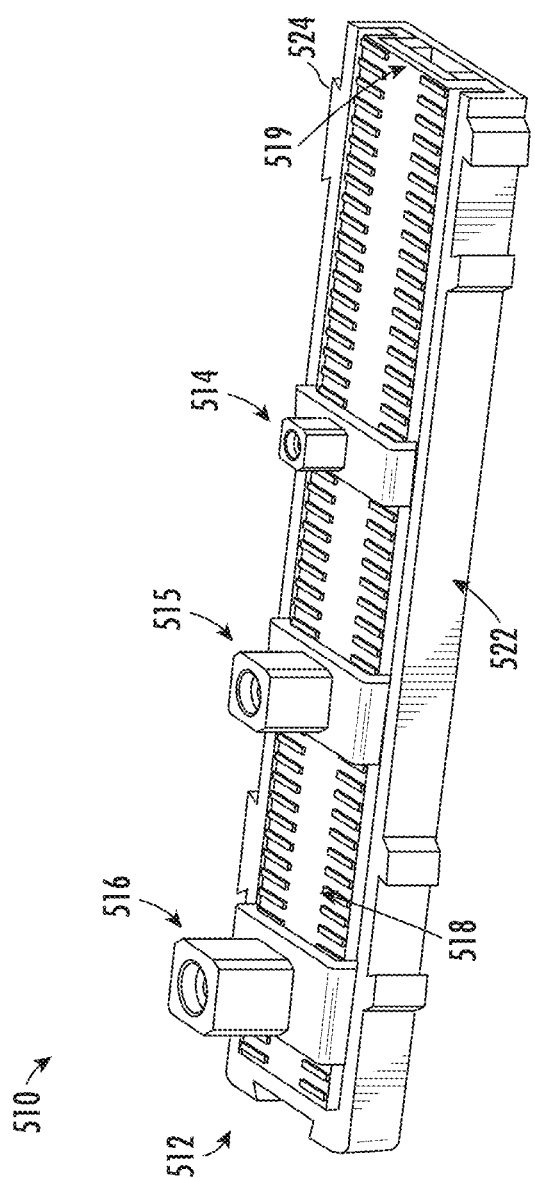
FIG. 26 is a perspective view of a socket storage rail and socket holders, according to another exemplary embodiment.
Figure 27:
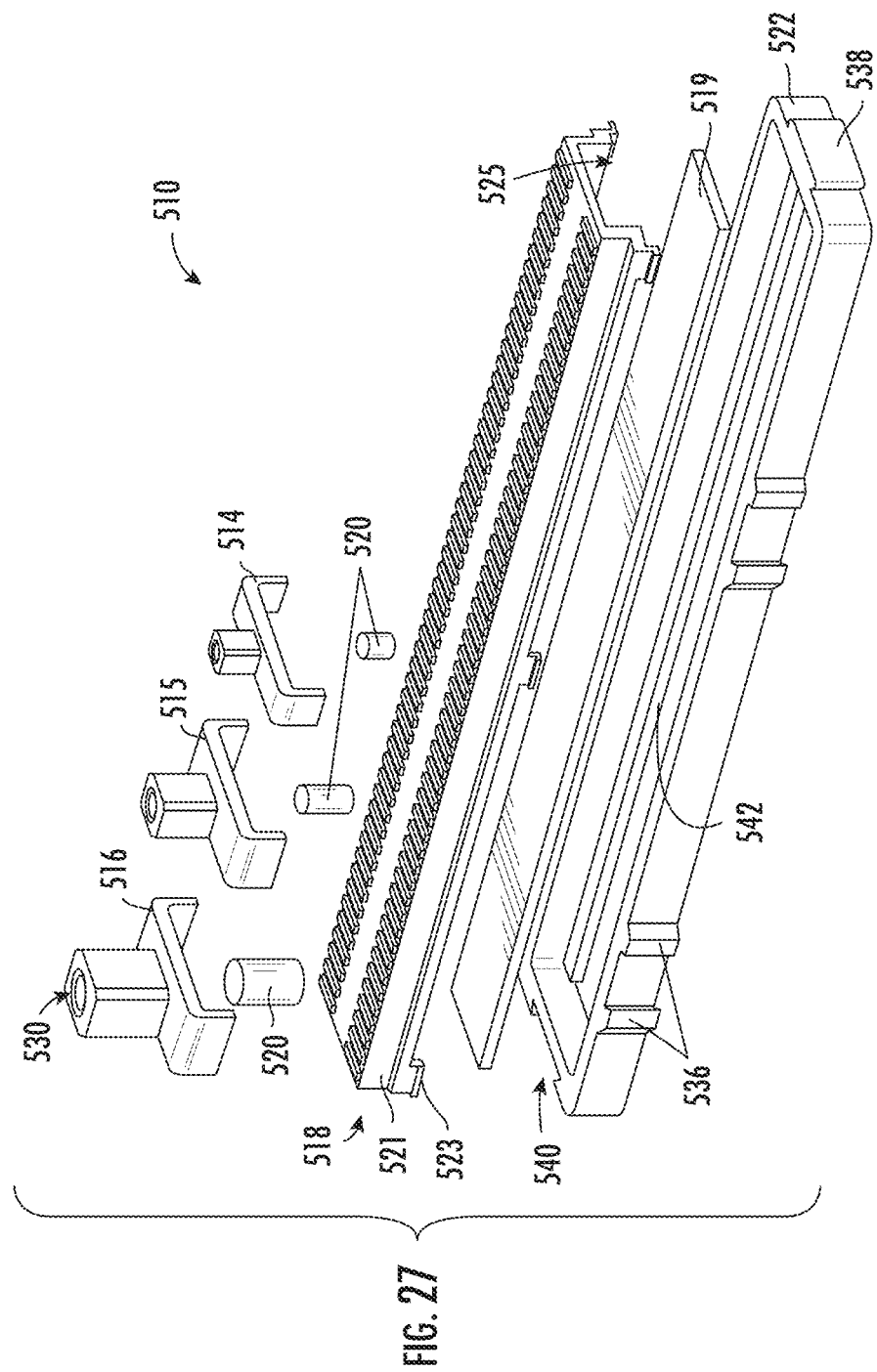
FIG. 27 is an exploded view of the socket storage rail of FIG. 26, according to an exemplary embodiment.

Referring to FIGS. 26-27, various aspects of a system for holding and/or storing sockets, shown as magnetic socket storage system 510 are shown. Socket storage system 510 is substantially the same as socket storage system 410 except for the differences discussed herein. Socket storage system 510 includes a storage device, shown as socket rail 512 and socket holders of various sizes, shown as socket holders 514, 515, 516. Socket rail 512 includes a magnetic body portion 518, a base 522, a bar, shown as a steel bar 519, and a plurality of magnets 520. The plurality of magnets 520 includes various sizes, with each magnet 520 sized to be pressed into one of the socket holders 514, 515, 516.

As shown in FIGS. 26-27, the spacing between the socket holders 514, 515, 516 on the magnetic body portion 518 can be adjusted. Each socket holder 514, 515, 516 engages with opposing side walls 521 of magnetic body portion 518 and base 522 to secure the socket holder 514, 515, 516 to socket rail 512. Side walls 521 include a plurality of clips 523 to allow for coupling or interlocking between magnetic body portion 518 and base 522. The steel bar 519 is positioned within cavity 542 of base and within recess 525 of magnetic body portion 518. The connection between socket rails 512 is substantially the same as socket rails 12, 212, and 412 including a plurality of dovetail attachments 524, 538 allowing for the creation of a modular storage system.

Figure 28:
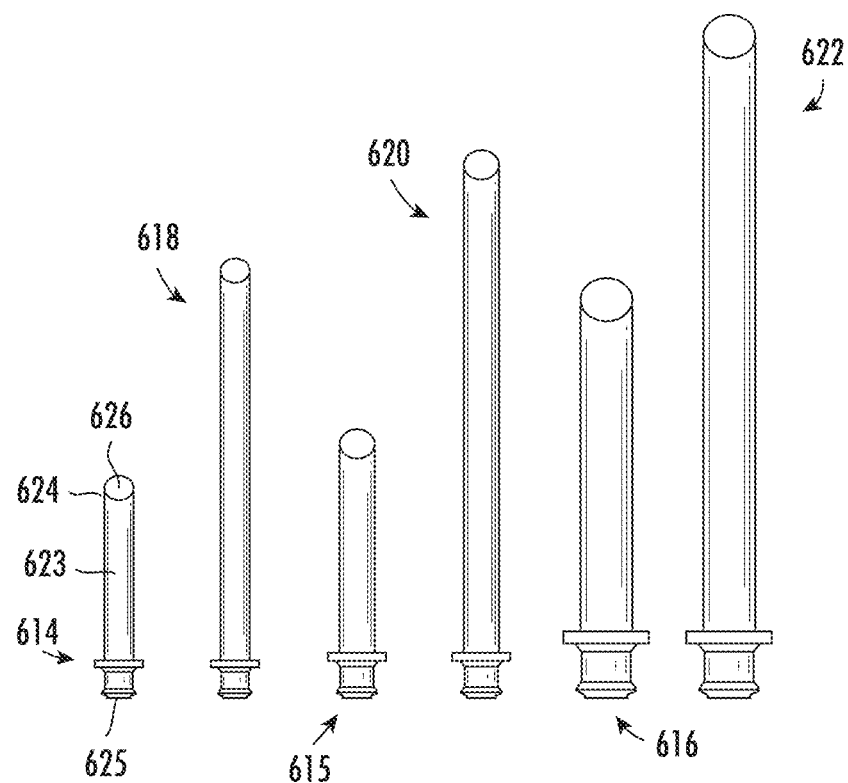
FIG. 28 is a perspective view of various socket posts, according to an exemplary embodiment.

Referring to FIG. 28, various rods or socket posts that may be used with (i.e., received within through holes 130, 430, 530) any of the socket storage systems (10, 210, 410, 510) are shown, according to an exemplary embodiment. Socket posts 614, 615, 616 are sized for use with sockets of ¼ inch, ⅜ inch, and ½ inch respectively. Socket posts 618, 620, 622 are substantially the same as socket posts 614, 615, 615 except they have a greater length.

As an example, socket post 614 includes a connecting portion 625 that is received within a through hole (e.g., 130, 430, 530) of a socket holder, a body portion 623, and an angled upper surface 624. Angled upper surface 624 includes a size marker 626 to alert a user to the size of the socket. In a specific embodiment, the size marker 626 may be embossed onto the angled upper surface 624.

Referring to FIG. 29, a socket storage system 710 including portions of socket storage systems 410 and 510 is shown, according to an exemplary embodiment. Socket storage system 710 provides increased customization for a user that may prefer a storage system with both fixed socket holders (i.e., 416) and movable socket holders (i.e., 516).

Figure 31:
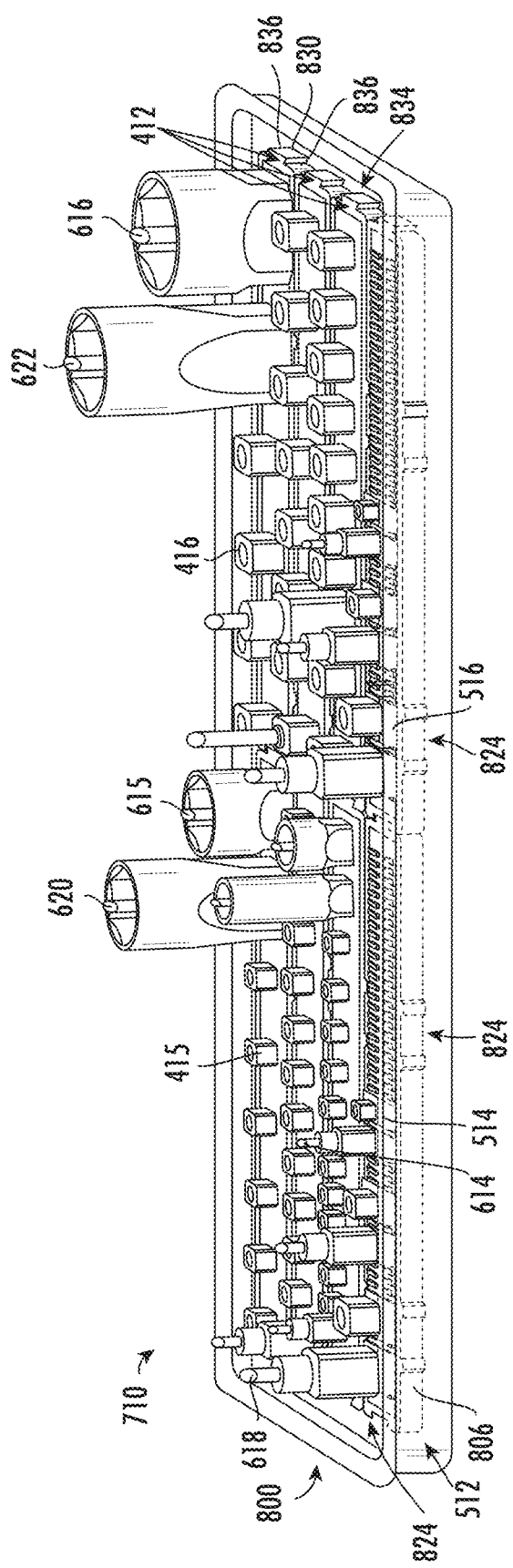
FIG. 31 is a perspective view of the socket storage kit of FIG. 30.

Referring to FIGS. 30-31, various views of a socket storage kit 810 is shown, according to an exemplary embodiment. Socket storage kit 810 includes socket storage system 710 and a socket storage tray 800. Socket storage tray 800 is configured to receive and interlock with socket storage rails (i.e., 12, 212, 412, and 512) or a system like socket storage system 710. Applicant believes further connection of the storage rails and/or system to a tray provide increased stability for the socket storage device compared to connection alone. For example, when the kit or tray 800 is placed in drawer (e.g., in a tool chest, cart, box, etc.) if the drawer is slammed shut by a user, the coupled rails help prevent the storage rails from falling or tipping over due to the lower center of gravity. Additionally, use of a tray provides a more easily transportable socket storage system. A user can carry the socket storage system (e.g., moving system from chest, car, box to work bench) without having the storage rails disconnect.

Socket storage tray 800 includes an outer wall 804 with a recess 802 defined within wall 804. Recess 802 is sized and/or shaped to receive socket storage system 710. Tray 800 includes a plurality of dovetail attachments or projections 824 extending inward from an inner surface 806 of wall 804. Tray 800 further includes a plurality of attachment recesses 834. Dovetail attachments 824 and attachment recesses 834 have corresponding shapes and/or sizes to allow for connection to socket storage system 710. In other words, the corresponding dovetail attachments 824 and attachment recesses 834 are configured to receive and engage dovetail attachments and recesses of the socket storage system, in this case socket storage system 710 to selectively couple socket storage system 710 to tray 800.

Each attachment recess 834 includes pair of inward facing (i.e., partially facing toward outer wall 804), angled surfaces 836 and a recess wall surface 830 that extends between the pair of inward facing, angled surfaces 836. Recess wall portion 830 extends parallel to outer wall 804 of tray 800. Each dovetail attachment 824 includes a pair of angled side walls 846 extending from inner surface 806 on an angle. An outer attachment wall 844 extends between and connects the pair of angled side walls 846. Outer attachment wall 844 is generally parallel to outer wall 804.

In the illustrated embodiment, tray 800 includes four dovetail attachments 824 or attachment recesses 834 along each longitudinal wall of the tray and four dovetail attachments 824 or attachment recesses 834 along each transverse wall such that tray 800 holds eight connected rails or the entire socket storage system 710. In other embodiments, the tray may be sized to include a different number of socket storage systems (i.e., 2, 4, 6, 10, 12) so that the tray 800 is suitable for various environments (tool chest, cart, box, etc.).

Figure 32:
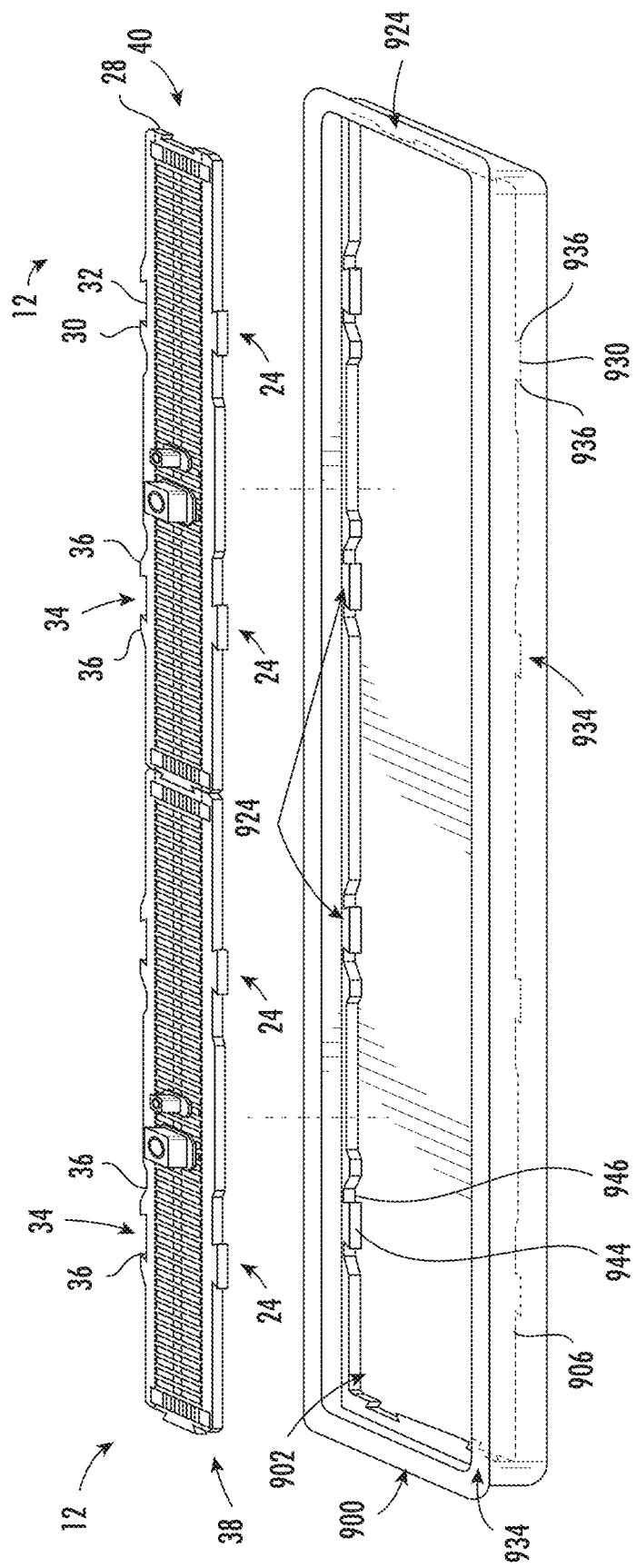
FIG. 32 is an exploded view of a socket storage kit including the socket storage system of FIG. 1, according to an exemplary embodiment.
Figure 33:
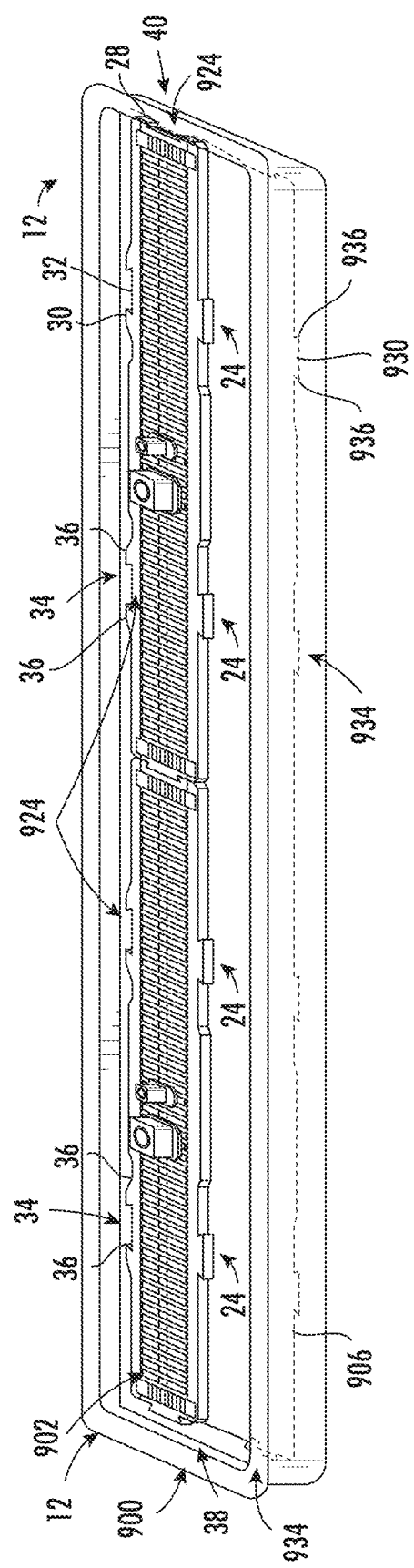
FIG. 33 is a perspective view of the socket storage kit of FIG. 32.

Referring to FIGS. 32-33, various views of a socket storage kit 910 is shown, according to an exemplary embodiment. Socket storage kit 910 includes one or more socket storage systems 10 and a socket storage tray 900. Socket storage tray 900 is configured to receive and interlock with socket storage rails 12 of socket storage system 10.

Socket storage tray 900 includes an outer wall 904 with a recess 902 defined within wall 904. Recess 902 is sized and/or shaped to receive one or more socket storage systems 10. Tray 900 includes a plurality of dovetail attachments or projections 924 extending inward (i.e. towards a center of the tray) from an inner surface 906 of wall 904. Tray 900 further includes a plurality of attachment recesses 934 extending outward (i.e., in direction of wall 904). Dovetail attachments 924 and attachment recesses 934 have corresponding shapes and/or sizes to allow for connection to socket storage system 10. In other words, the corresponding dovetail attachments 924 and attachment recesses 934 are configured to receive and engage dovetail attachments and recesses of the socket storage system, in this case socket storage system 10 and/or socket rails 12 to selectively couple socket storage system 10 and/or socket rails 12 to tray 900.

Each attachment recess 934 includes pair of inward facing (i.e., partially facing toward outer wall 904), angled surfaces 936 and a recess wall surface 930 that extends between the pair of inward facing, angled surfaces 936. Recess wall portion 930 extends parallel to outer wall 904 of tray 900. Each dovetail attachment 924 includes a pair of angled side walls 946 extending from inner surface 906 on an angle. An outer attachment wall 944 extends between and connects the pair of angled side walls 946. Outer attachment wall 944 is generally parallel to outer wall 804.

In the illustrated embodiment, tray 900 includes four dovetail attachments 924 or attachment recesses 934 along each longitudinal wall of the tray and two dovetail attachments 924 or attachment recesses 934 along each transverse wall such that tray 900 holds four connected socket storage systems 10. In other embodiments, the tray may be sized to include a different number of socket storage systems (i.e., 2, 6, 8, 10, 12) so that the tray 900 is suitable for various environments (tool chest, cart, box, etc.).

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A socket storage system comprising:
   a first socket rail, the first socket rail comprising:
      an upper body portion, the upper body portion including a plurality of walls that define a plurality of slots between adjacent walls;
      a lower body portion, the lower body portion coupled to the upper body portion; and
      a bar, the bar positioned between the upper body portion and the lower body portion and extending along a longitudinal axis of the first socket rail; and
   a socket holder, the socket holder removably coupled to the first socket rail;
   wherein each of the plurality of slots is configured to receive the socket holder;
   wherein, when the socket holder is positioned within one of the plurality of slots, the socket holder extends around and engages the bar to couple the socket holder to the first socket rail.

2. The socket storage system of claim 1, wherein the socket holder comprises:
   a neck portion, the neck portion configured to hold a socket; and
   a clip portion coupled to the neck portion, the clip portion extending downward and away from the neck portion and including a pair of legs, each of the pair of legs extending into an inward extension;
   wherein an opening is positioned between the pair of legs, and wherein the opening is sized to receive the bar.

3. The socket storage system of claim 2, wherein the neck portion of the socket holder includes a top surface with a through hole defined in the top surface, the through hole configured to receive a socket post, the socket post extending away from the top surface of the neck portion and configured to secure the socket to the socket holder.

4. The socket storage system of claim 1, the first socket rail further comprising a plurality of dovetail attachments and attachment recesses positioned along an outer wall of the upper body portion.

5. The socket storage system of claim 4, wherein each dovetail attachment includes a pair of angled side walls extending from the outer wall of the upper body portion on an angle and an outermost dovetail attachment wall extending between and connecting the pair of angled side walls.

6. The socket storage system of claim 4, wherein each attachment recess comprises:
   a pair of attachment projections, each of the pair of attachment projections including an inward facing surface; and
   a recess wall portion, the recess wall portion extending between and connecting the inward facing surfaces.

7. The socket storage system of claim 4, wherein the plurality of dovetail attachments and attachment recesses are configured to receive and engage with dovetail attachments and attachment recesses of a second socket rail such that the first and second socket rails can be selectively coupled together.

8. The socket storage system of claim 7, further comprising a tray, the tray comprising a plurality of corresponding dovetail attachments and attachment recesses configured to receive and engage with the dovetail attachments and attachment recesses of the first and second socket rails such that the socket rails can be selectively coupled to the tray.

9. A socket storage device comprising:
   a socket rail, the socket rail comprising:
      an upper body portion, the upper body portion including a plurality of walls that define a plurality of slots between adjacent walls;
      a lower body portion, the lower body portion coupled to the upper body portion;
      a locking bar, the locking bar positioned between the upper body portion and the lower body portion and extending along a longitudinal axis of the socket rail; and
      a sliding lock coupled to an end of the locking bar and slidably engaged with the upper body portion; and
   a socket holder, the socket holder configured to be received within the plurality of slots and coupled to the socket rail by the locking bar;
   wherein the sliding lock is moveable between an unlocked position in which the socket holder is removable from socket rail and a locked position in which the locking bar engages the socket holder to secure the socket holder to the socket rail.

10. The socket storage device of claim 9, wherein the socket holder comprises:

a neck portion, the neck portion configured to hold a socket; and a clip portion coupled to the neck portion, the clip portion extending downward and away from the neck portion and including a pair of legs, each of the pair of legs extending into an opposing inward extension;

an opening positioned between a bottom of the neck portion and the opposing inward extensions; and a gap defined between the opposing inner surfaces of the inward extensions and positioned below the opening and connected to the opening.

11. The socket storage device of claim 10, wherein, when the sliding lock is in the unlocked position, the locking bar is positioned within the opening of the socket holder above the gap.

12. The socket storage device of claim 10, wherein, when the sliding lock is in the locked position, the locking bar is shifted within the opening of the socket holder such that the locking bar is positioned above one of the opposing inward extensions.

13. The socket storage device of claim 9, wherein, when the sliding lock is moved into the locked position or the unlocked position, the locking bar is translated in a direction perpendicular to the longitudinal axis of the socket rail.

14. The socket storage device of claim 9, the socket rail further comprising:

a projection extending outward from an outer wall of the upper body portion; and a recessed portion positioned along the outer wall of the upper body portion;

wherein the projection and recessed portion allow for selective coupling of the socket rail to another socket rail or a tray for storage.

15. The socket storage device of claim 14, wherein the outer wall of the upper body portion includes a pair of longitudinal outer walls and a pair of end walls extending between and connecting the pair of longitudinal outer walls, wherein the projection is positioned along at least one of the pair of longitudinal outer walls or at least one of the pair of end walls.

16. A socket storage system comprising:

a first socket rail, the first socket rail comprising:
    an upper body portion, the upper body portion including a plurality of walls that define a plurality of slots between adjacent walls;
    a lower body portion, the lower body portion coupled to the upper body portion; and
    a locking bar, the locking bar positioned between the upper body portion and the lower body portion and extending along a first longitudinal axis of the first socket rail;

a second socket rail, the second socket rail comprising:
    an upper body portion, the upper body portion including a plurality of walls that define a plurality of slots between adjacent walls;
    a lower body portion, the lower body portion coupled to the upper body portion; and
    a locking bar, the locking bar positioned between the upper body portion and the lower body portion and extending along a second longitudinal axis of the second socket rail; and a socket holder, the socket holder removably coupled to the first socket rail or the second socket rail;

wherein the first socket rail and the second socket rail each include a plurality of dovetail attachments and attachment recesses positioned along an outer wall of the upper body portion such that the first socket rail and the second socket rail can be removably coupled together.

17. The socket storage system of claim 16, wherein, when the first socket rail is coupled to the second socket rail, the first longitudinal axis is collinear with the second longitudinal axis.

18. The socket storage system of claim 16, wherein, when the first socket rail is coupled to the second socket rail, the first longitudinal axis is parallel to the second longitudinal axis.

19. The socket storage system of claim 16, wherein the socket holder comprises:

a neck portion, the neck portion configured to hold a socket; and a clip portion coupled to the neck portion, the clip portion extending downward and away from the neck portion and including a pair of legs, each of the pair of legs extending into an inward extension;

wherein an opening is positioned between the pair of legs, and wherein the opening is sized to receive the locking bar.

20. The socket storage system of claim 16, further comprising a tray, the tray including a plurality of corresponding dovetail attachments and attachment recesses configured to receive and engage with the dovetail attachments and attachment recesses of the first and second socket rails such that the first and second socket rails can be selectively coupled to the tray.

* * * * *